(12) United States Patent
Schultz et al.

(10) Patent No.: US 7,644,041 B1
(45) Date of Patent: Jan. 5, 2010

(54) AUTOMATED BANKING MACHINE PROVIDING A CASH PAYMENT OPTION

(75) Inventors: David Schultz, Massillon, OH (US); Dale H. Blackson, Canton, OH (US); Nat Ramachandran, Uniontown, OH (US); Mark D. Smith, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 1247 days.

(21) Appl. No.: 10/376,955

(22) Filed: Feb. 27, 2003

Related U.S. Application Data

(63) Continuation-in-part of application No. 09/776,503, filed on Feb. 2, 2001.

(60) Provisional application No. 60/360,675, filed on Mar. 1, 2002, provisional application No. 60/250,269, filed on Nov. 30, 2000, provisional application No. 60/180,490, filed on Feb. 5, 2000.

(51) Int. Cl.
 *G06Q 40/00* (2006.01)

(52) U.S. Cl. .............................. 705/43; 705/26; 705/42; 705/44; 705/45

(58) Field of Classification Search ............. 705/42–45, 705/26; 235/382
See application file for complete search history.

(56) References Cited

U.S. PATENT DOCUMENTS

| | | | | |
|---|---|---|---|---|
| 5,778,187 | A * | 7/1998 | Monteiro et al. | 709/231 |
| 6,045,039 | A * | 4/2000 | Stinson et al. | 235/379 |
| 6,286,756 | B1 * | 9/2001 | Stinson et al. | 235/379 |
| 6,381,626 | B1 * | 4/2002 | De Leo et al. | 709/200 |
| 2002/0161655 | A1 * | 10/2002 | Bredin | 705/26 |
| 2003/0217005 | A1 * | 11/2003 | Drummond et al. | 705/43 |

\* cited by examiner

*Primary Examiner*—Jagdish N Patel
(74) *Attorney, Agent, or Firm*—Ralph E. Jocke; Daniel D. Wasil; Walker & Jocke

(57) ABSTRACT

An automated teller machine (ATM) (10) includes a display device (14), an input device (16), a cash acceptor (22), and a cash dispenser (24). The ATM also has access to a network, such as the Internet. The ATM enables a user thereof to make online purchases of goods and to receive from the user a cash payment for the purchase through a cash acceptor. The ATM administrator pays the merchant who supplies the goods. An ATM may be operative to also dispense purchased digital content and/or gift certificates. Purchased goods may also be hand delivered to an indicated address. The ATM may be further operative to charge a user fee for transactions.

21 Claims, 11 Drawing Sheets

AUTOMATED BANKING MACHINE PROVIDING A CASH PAYMENT OPTION

CROSS REFERENCE TO RELATED APPLICATIONS

This application is a continuation-in-part of U.S. application Ser. No. 09/776,503 filed Feb. 2, 2001 which claims benefit pursuant to 35 U.S.C. § 119(e) of Provisional Application Ser. Nos. 60/180,490 filed Feb. 5, 2000 and 60/250,269 filed Nov. 30, 2000. This application also claims benefit pursuant to 35 U.S.C. § 119(e) of Provisional Application Ser. No. 60/360,675 filed Mar. 1, 2002.

TECHNICAL FIELD

This invention relates to the ordering of goods or services through a network from an automated transaction machine. The exemplary automated transaction machine permits cash payment for the ordered goods.

BACKGROUND ART

Automated transaction machines are known in the prior art. For purposes of this disclosure an automated transaction machine or automated banking machine shall include any device which is capable of carrying out transactions including transfers of value. Furthermore, it should be understood that for purposes of this disclosure the terms cash and currency are interchangeable. A common type of automated transaction machine is an automated teller machine (ATM). ATMs are typically operative to perform banking transactions such as dispensing cash, transferring value between banking accounts, or accepting deposits. Many ATMs are located in retail or service facilities such as stores, gas stations, restaurants and bars. The owners of these facilities often generate income from the ATMs through service fees on transactions performed with the ATM. For example, if a user withdraws an amount of cash from the ATM, the user may be charged a small transaction fee.

If the ATM has only marginal use, the income generated may not be sufficient to justify the expense of maintaining the ATM. For example, maintenance and service costs may consume a large portion of the monthly income generated by an ATM which has low transaction volumes. Exemplary innovations described herein enable ATMs to generate additional income by enabling an ATM to perform additional income producing activities that do not significantly increase the expense of maintaining the ATM.

Methods for the digital recording of sound are also known. Such digital recordings are typically distributed on compact disks (CD) for playback on a CD player. As sound systems have become a standard feature of any new personal computers, digital sound recordings are also being distributed as computer files. Common formats for sound computer files include WAV (Waveform Audio File Format) and MP3 (MPEG-1 Audio Layer-3). To play such files, computer systems can employ a sound file player application such as the Windows Media Player. Sound file player applications read the digital sound files and output corresponding music through the sound card and speakers of the computer system.

Digital sound recordings may also be copied directly from an audio CD through a process called "ripping." Essentially ripping refers to the reading of the digital information that represents audio on the CD and saving the information in a computer readable sound file. Different formats of sound files have different characteristics. For example WAV files are typically uncompressed digital versions of sampled sound. MP3 files are typically created by compressing a sound sequence into a very small file (about one-twelfth the size of a corresponding WAV file). However, MP3 files are "lossy" meaning that the compression algorithms remove digital information that most people cannot hear or cannot distinguish from other sounds. If a high sampling rate is used to generate the MP3 files, the sound quality is only slightly inferior to that of the original audio file. However, the advantage of the smaller size of the MP3 files is significant. These advantages include the ability to store more hours of sound recordings per amount of space in physical storage mediums such as, for example, hard disks, RAM, and flash memory cards. Also, the smaller size of MP3 files enables them to be downloaded much faster through a network such as the Internet.

Numerous web sites on the Internet offer digital sound files such as MP3 files for downloading to a personal computer. Also as a result of the popularity of digital sound files, portable computer systems have been developed such as the Diamond RIO which are specifically designed to load and play sound recording files.

Unfortunately, the technology associated with creating MP3 files from a CD and downloading MP3 files from web sites has resulted in a significant amount of music piracy and lost revenues for artists and music recording companies. Anyone with a home PC can generate an unlimited number of copies of digital sound files. By placing such pirated files on an Internet web site, unlimited distribution of pirated sound files is possible.

To deter copyright infringement and unrestricted piracy of digital sound recordings, the music industry is promoting an alternative file format for storing digital recordings called SDMI (Secure Digital Music Initiative). The SDMI specification for sound files offers similar compression characteristics as the MP3 file format; however, SDMI is designed to have built in copyright protection features which limit the playback and duplication of the files. In addition Microsoft has developed an alternative specification for compressing and copyright protecting sound files called Windows Media.

Because MP3 files are already widely accepted as the de facto standard, it may be very difficult for new file formats to replace MP3. The popularity of MP3 files coupled with unlimited sound file piracy may significantly decrease the revenue that recording labels and artists generate from the sale of music and other forms of audio. Exemplary forms of the innovations described herein provide a system of distributing MP3 files that enables the copyright holder to receive licensing fees for each distribution of an MP3 file.

Distribution of sound recordings from the Internet makes it much easier for an individual artist to reach a mass audience for their work without a recording label. As a result the variety of music that is available over the Internet is exploding. Many of the titles can be downloaded without a fee. Unfortunately much of the music that has no fee is low quality, amateurish, and not very desirable. If the artist is relatively unknown, it is very difficult to get users to download music for a fee. This is because most individuals are hesitant to pay for downloaded MP3 files before being familiar with the artist.

If the music is given away on a no-fee basis or even a low-fee preview basis, it may be difficult to generate any income from the music. Once the MP3 version of the music is downloaded, the MP3 file can be played, copied, and distributed an unlimited number of times without generating income for the artist. Exemplary forms of the innovations described herein provide a system that enables individuals to test out songs for a small fee, but does not enable the users to copy or distribute the sound files.

To take advantage of the benefits of playing sound recording files rather than CDs or cassettes, a user must have a PC. Although the cost of a personal computer has dramatically decreased over the last two decades, computers are still significantly more expensive than a CD player. Portable sound file players such as the Diamond RIO are operative to play music independently from a PC; however they still must be connected to a PC at some point to upload a new set of MP3 files. Consequently there exists a need for a new system of ordering goods online, such as sound files, that does not require the user to have a computer.

The current methods for delivery of forms of audio, visual, print and other media may also have drawbacks. Exemplary forms of the innovations described herein provide for a better way of delivering the content of such media.

Current methods and devices enabling persons to purchase goods, services or other items also have limitations. Exemplary forms of the innovations described herein enable persons to purchase and/or to pay for goods, services or other items through the use of automated banking machines.

DISCLOSURE OF INVENTION

It is an object of an exemplary embodiment of the present invention to provide an automated transaction machine that is operative to enable a user thereof to order or to pay for goods through a private network or public network such as the Internet.

It is a further object of an exemplary embodiment of the present invention to provide an automated transaction machine that is operative to dispense digital information.

It is a further object of an exemplary embodiment of the present invention to provide an automated transaction machine that is operative to dispense digital information to a portable storage medium.

It is a further object of an exemplary embodiment of the present invention to provide an automated transaction machine that is operative to dispense digital information to a portable computing system.

It is a further object of an exemplary embodiment of the present invention to provide an automated transaction machine that is operative to dispense digital information in exchange for a user fee.

It is a further object of an exemplary embodiment of the present invention to provide an automated transaction machine that is operative to output digital information to an output device in exchange for a user fee.

It is a further object of an exemplary embodiment of the present invention to provide an automated transaction machine that is operative to distribute user fee income generated from the dispense of digital information among a plurality of entities.

It is a further object of an exemplary embodiment of the present invention to provide an automated transaction machine that is operative to download digital information from a digital information source located on a network.

It is a further object of an exemplary embodiment of the present invention to provide an automated transaction machine that is operative to dispense digital sound recordings.

It is a further object of an exemplary embodiment of the present invention to provide an automated transaction machine that is operative to play digital sound recordings through a sound system.

It is a further object of an exemplary embodiment of the present invention to provide an automated transaction machine that is operative to dispense digital sound recordings onto a portable storage medium.

It is a further object of an exemplary embodiment of the present invention to provide an automated transaction machine that is operative to dispense digital sound recordings to a portable digital sound file player.

It is a further object of an exemplary embodiment of the present invention to provide an automated transaction machine that is operative to charge an account of a user in exchange for the playing of digital sound recordings.

It is a further object of an exemplary embodiment of the present invention to provide an automated transaction machine that is operative to provide a selection of digital sound recordings to play when the user performs a banking or other transaction at the machine.

It is a further object of an exemplary embodiment of the present invention to provide an automated transaction machine that is operative to offer a selection of digital sound recordings to play that are downloaded from a network such as the Internet.

It is a further object of an exemplary embodiment of the present invention to provide a system and method through which an automated transaction machine may be used to deliver and manipulate image content.

It is a further object of an exemplary embodiment to provide a system in which purchasers of goods can pay for goods ordered elsewhere through operation of an ATM.

It is a further objet of an exemplary embodiment to provide a system and method enabling use of an automated banking machine to acquire goods in the form of gift certificates that can be redeemed by certain affiliated merchants.

Further objects of exemplary embodiments of the present invention will be made apparent in the following Best Modes for Carrying Out Invention and the appended claims.

The foregoing objects are accomplished in some exemplary embodiments of the invention by an ATM that is operative to permit a user thereof to remotely purchase goods. The goods may be delivered physically, such as by mail, or electronically, such as digitally. For example, the purchase may include the dispense of digital information which is also referred to herein as digital content. In the exemplary embodiment the digital information may include digital sound recording files that may be output through an output device such as a sound system in operative connection with the ATM. However in alternative embodiments, the digital information may include other types of information that may be digitally stored and transported over a network. Other examples of digital information include digital representations of images, books, software, audiovisual works, movies, TV shows, magazines, newspapers, games, compilations, and databases. Of course it should be understood that in some embodiments digital and/or non digital goods may be physically delivered, such as by for example USPS, UPS, or FedEx, or by being provided by a service provider or other merchant.

An exemplary ATM is in operative connection with storage read/write devices such as a floppy disk drive, smart card drive, flash memory drive, or any other device that is operative to read and write information to a portable storage medium. In the exemplary embodiment the ATM is operative to save digital information such as digital sound recording files to the portable medium.

Alternative embodiments of the ATM may include a portable computing device communication port that is operative to communicate with a portable computing device. When a portable computing device, such as a laptop computer, hand-held computer, or sound file player is placed in operative connection with the communication port, the ATM is operative to send digital information such as digital sound recording files to the portable computing device. Examples of communication ports that are operative for use with embodiments of the present invention include a Universal Serial Bus (USB) port, parallel port, RS-232 Serial Port, Infrared (IR) Port, Radio Frequency (RF) port, or any other type of physical or wireless communication port.

An exemplary ATM may be operatively programmed to accept a fee from a user in exchange for its use in purchasing goods, such as outputting either digital information or saving digital information to a portable storage medium or portable computing device. For ATMs that include a card reader and are in operative connection with a host banking system, the ATM may be operative to charge the fee to an account associated with a credit card, debit card, or smart card for example. For ATMs that include a currency accepting device, the ATM may be operative to accept currency in exchange for a goods order, such as outputting or saving digital information.

In an exemplary embodiment, the ATM is in operative connection with a private network, virtual private network or public network such as the Internet. For purposes herein references to a network shall include one or more operatively connected networks. The ATM is programmed to enable a user of the ATM to view and select digital information that is downloaded across the network. For example the ATM is operative to display visual outputs corresponding to a plurality of sound recording files such as MP3 files, that can be executed to reproduce individual musical performances such as songs. The ATM is further operative to download one or more of these sound files in exchange for a fee and to either play the song through a sound system or send the song to a portable storage medium or computing device.

In alternative embodiments, the ATM may be operative to periodically download a selection of digital information in response to programmed instructions to acquire one or more categories of digital information. By pre-downloading and storing digital information, the ATM does not need to be continually connected to a source of digital information. Also any delay caused by having to download individually selected information files across a network is eliminated because the files are stored locally in the ATM.

For example when the digital information corresponds to sound recording files, the ATM may be operative to periodically download sound files that correspond to the most popular songs for the week or other time period. In another example if the digital information corresponds to digital books, the ATM may be operative to periodically download digital books that correspond to a fiction or nonfiction best seller list or ranking. In another example if the digital information corresponds to broadcast TV shows, the ATM may be operative to periodically download digital files that correspond to the TV shows that were broadcast over a certain time period. Of course in other embodiments other types of digital information may be delivered and stored in the machine for delivery to users, or downloaded at the time in response to the user's request.

In an exemplary embodiment, the ATM may be operative to distribute the user fees for the dispense of digital information among a plurality of entities, including the owner of the ATM, the source of the digital information, and/or a licensing organization. This distribution may be performed for each user transaction or may be performed on a periodic basis. When the distribution is performed periodically, the ATM is operative to calculate an amount of value that corresponds to licensing fees for digital information that is downloaded or dispensed by the ATM during a time period. An amount of value equal to this calculated amount may then be transferred from an account associated with the ATM such as the operator thereof to the source(s) of the digital information and/or to licensing organizations.

When the digital information requires copy protection features, the ATM may be further operative to include or activate a copy protection feature responsive to the type of license being purchased by the user. For example, if the ATM dispenses SDMI or Windows Media sound recording files, the ATM may be operative to configure the files to limit where and how long the sound files can be played as well as whether duplication is allowed.

Alternative exemplary embodiments provide for the delivery and manipulation of image files through an automated transaction machine. In some such embodiments the machine may include a photographic quality printer and a user may selectively manipulate and/or print image files from a local source such as storage media or a digital camera, or a remote source such as a server associated with a film processor.

Alternative exemplary embodiments provide not only for the purchase of tangible goods or digital goods, but service-based goods. For example, an automated transaction machine may enable a user to access web sites that require a fee for their use, such as Internet gaming or other gaming facilities. Exemplary embodiments may enable a user to order goods and pay for such goods at the machine. Alternative embodiments may enable a user to pay at the machine for goods ordered elsewhere. Alternative embodiments may enable a user to acquire goods in the form of redeemable certificates that are redeemable for other types of goods or services. A variety of embodiments may be encompassed within the scope of the claimed invention.

BEST MODES FOR CARRYING OUT INVENTION

Figure 1:
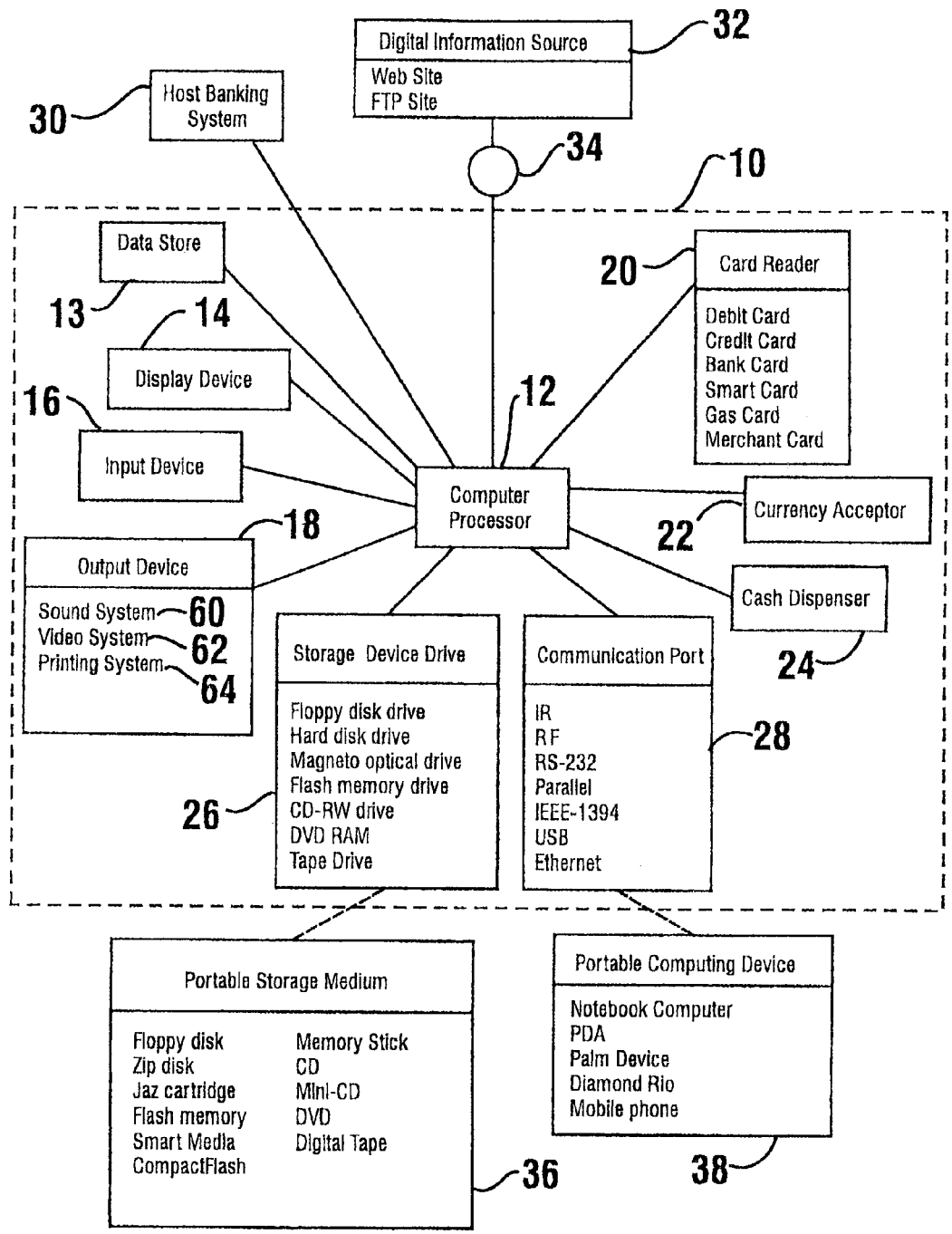
FIG. 1 is a schematic view representative of an exemplary embodiment of an automated transaction machine and system that is operative to dispense digital information.

Referring now to the drawings and particularly to FIG. 1, there is shown therein a schematic view of an automated transaction machine of an exemplary embodiment generally indicated as ATM 10. The ATM 10 includes at least one computer processor 12 referred to alternatively herein as a computer, that is operatively programmed to enable the ATM to perform at least one banking transaction such as the dispense of cash. The computer processor 12 is also operatively programmed to enable the ATM to dispense digital content which is alternatively referred to herein as digital information. To perform these functions the ATM further includes in operative connection with the computer processor 12, at least one data store 13, a display device 14, at least one input device 16, at least one output device 18, a card reader 20 which also serves as an input device, and a cash dispenser 24. The ATM 10 is further operative to communicate through at least one communication device such as a modem, network access card, etc. with at least one financial transaction processing computer which is operative to carry out financial transfers which in this example is host banking system 30. ATM 10 also is enabled to communicate through an appropriate communications device with at least one digital information source 32. In the exemplary embodiment the ATM 10 is operative to download digital information from the digital information source 32 through a network 34 such as the Internet.

It should be understood that the ATM 10 and system are exemplary and in other embodiments automated transaction machines may include other or additional devices and may operate in other types of systems. For example, embodiments of the present invention may include in operative connection with the computer processor 12, a currency acceptor 22, a data store including a storage device drive 26, and a communication port 28 which serves as an output device. The storage device drive 26 serves as a local data store and enables the computer processor to dispense digital information to a portable storage medium 36. The communication port 28 enables the computer processor to cause the dispense of digital information to a portable computing device 38.

Figure 2:
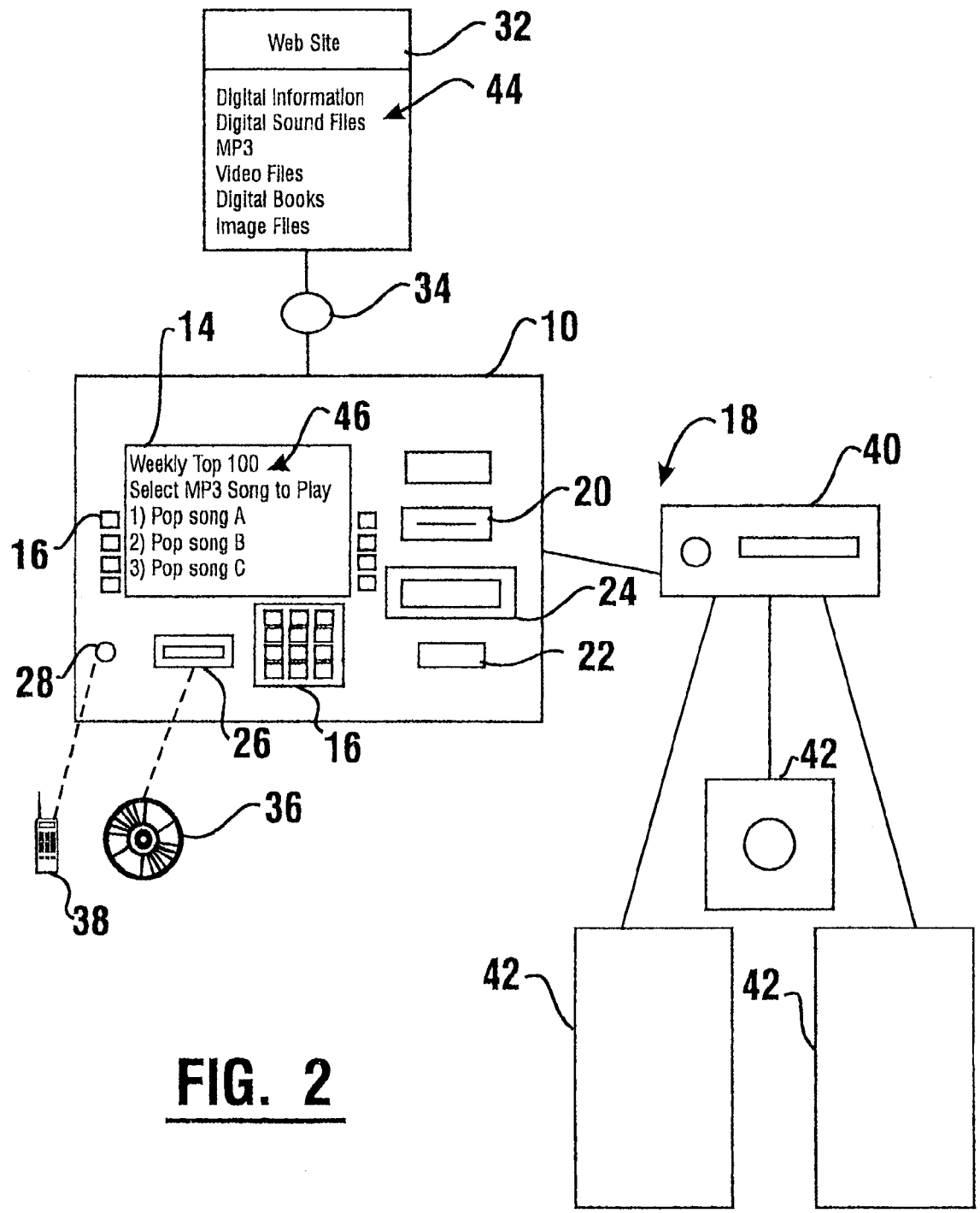
FIG. 2 is a schematic view representative of an exemplary embodiment of an automated transaction machine and system that is operative to dispense digital sound recordings.

FIG. 2 schematically shows an exemplary embodiment of the ATM 10 that is operative to dispense both cash and digital content comprising sound recordings such as music and songs. However, it is to be understood that some embodiments may also provide for the dispensing of other types of digital information including digital representations of images, books, software, audiovisual works, movies, TV shows, magazines, newspapers, games, compilations, databases and other types of digital content that may be delivered in a digital format.

Exemplary ATM 10 includes a display device 14 such as a CRT monitor or LCD display.

The display device is operative responsive to the processor to output user interface indicia 46. The user interface indicia may include instructional outputs for operating the ATM as well as content indicia which are representative of the portions of digital information that may be dispensed from the ATM for a fee. In some embodiments the content indicia may include listings of songs, movies, books or other portions of the digital content which a user may select to have delivered. Exemplary embodiments may also include graphical representations regarding the information, such as pictures of the artist or CD liner in the case of music files. Audio and/or visual outputs may also be provided to identify, and in some cases enable the user to sample the available information.

Exemplary ATM 10 also includes at least one input device 16 such as a keypad and selection buttons. The input device(s) enable the user to enter operation inputs such as a personal information number (PIN) corresponding to an account, an amount of cash to withdraw, or a selection of a particular digital sound recording or other portion of the digital content to dispense. Although this described embodiment includes function keys and a keypad, alternative embodiments may use other or additional types of input devices for entering information, such as a touch screen device, a speech recognition system, or a track ball.

ATM 10 also includes a cash dispenser 24 and a card reader 20. The card reader 20 is an input device operative to read indicia corresponding to account information from a user's card. The card may be a bank card, credit card, debit card, gas card, merchant card, smart card, or other medium that is operative to store account data and/or other information which may be used to identify a user or their accounts. In some embodiments the ATM may include a biometric type reading device which may identify the user by a characteristic thereof. Such biometric reading devices may include for example a fingerprint reader, iris scanner, retina scanner, voice recognition device, facial recognition reader or other device. The exemplary ATM 10 is operative to dispense a selected amount of cash to the user from the cash dispenser 24, and to debit the account of the user through communication with a financial transaction computer such as a host banking system. The exemplary ATM 10 is also operative to debit user fees from the account for dispensing digital information from the ATM as well.

In alternative embodiments, the ATM may also include at least one currency accepting device 22. For users who do not wish to use an account to pay for the dispense of digital information, the ATM is operative to receive the user fees in the form of cash such as bills and/or coin, using the currency accepting device 22.

In the exemplary embodiment, the digital information dispensed by the ATM 10 includes digital sound recording files 44. Examples of digital sound recording files include MP3 files, WAV files, SDMI files, and Windows Media files. Each file may correspond to an individual music selection or song. However, sound files may correspond to any collection of sounds of any type and length. Other examples of sound recording files include compilations of songs such as are found on music CDs and spoken textual material corresponding to news articles, stories, speeches and books.

In the exemplary embodiment, the ATM 10 acquires sound files to dispense from at least one remote digital information source 32. The source 32 may include a web site or FTP site on the Internet, or sources in other public or private networks. The exemplary ATM 10 is operative to periodically download a plurality of sound files that match certain customizable programmed criteria. The ATM may also download corresponding graphics or video files associated with the sound files. These downloaded files are stored locally at the ATM in a local content data store 13 such as a hard drive. The ATM 10 is operative to display or output graphical, textual and/or audio content indicia representative of these sound files with the display device 14. A user of the ATM 10 may then provide one or more inputs to select and/or dispense one or more of these sound files.

The ATM may be programmably configured with different types of downloading criteria. For example, if the ATM is located in a dance club, the downloading criteria may be configured to have the ATM periodically download the sound files that correspond to the top 100 most popular dance songs for the month. If the ATM is located in a book store, the ATM may be configured to periodically download sound files representative of the best-selling fiction and nonfiction books for the month.

In the exemplary embodiment if the data store 13 does not have already stored therein the sound file that a user desires, the exemplary ATM is further operative to have the user enter a selection input corresponding to the desired sound file such as a title or the name of an artist or group. The ATM is then operative to query one or more remote content data stores for the requested sound file(s). A message is returned to the ATM which is operative to cause the processor to generate a listing of matching sound files which is displayed on the display device 14 of the ATM 10. In a response to one or more dispense inputs from the customer, and for a fee, the ATM 10 is then operative to download and dispense one or more of the matching sound files from an output device.

In some embodiments in which a network connection such as an Internet connection is not available or is not always used, the ATM may be operative to acquire sound files from portable storage mediums such as CDs. Such sound files may then be copied or ripped from the CD and saved locally to the data store 13 in the machine.

The exemplary ATM may be operative to dispense digital information in a plurality of different ways depending on the type of digital information. For example the ATM described in connection with FIG. 2 further includes an output device 18 that includes a sound system 60. The sound system 60 includes a sound signal amplifier 40 with a plurality of speakers 42. The ATM 10 is operative to output though the sound system 60, analog or digital signals that correspond to selected digital sound recording files. The signal amplifier 40 is operative to output sound through the speakers 42 that corresponds to the sound file signals. Such an ATM may then function as a fee-based digital music player or jukebox. For restaurants, bars, and other facilities that offer music, the exemplary embodiment offers the ability to generate user fees for both the dispensing of cash and the dispensing of audible music.

For other forms of digital information that is visual, such as text, documents, images or video for example, the ATM may be operative to output such digital content either through the display device 14 of the ATM 10 or through an output device 18 that includes a video system 62 or a printing system 64. A video system may include one or more monitors, TVs, speakers, LCD displays, or projection TV. Embodiments of the present invention may include multiple output devices for outputting multiple forms of digital information concurrently. A printing system 64 may include a monochrome or color printer capable of outputting documents and/or photo quality prints of images or other graphics.

If multiple sound files or other forms of digital information have been selected for output through the output device, the exemplary embodiment may be operative to sequentially output each song either in the order the digital information was selected, or in other orders, including alphabetical by title of song, artist, album, style, or in a random order.

Alternative embodiments may also dispense digital information such as sound files, to other storage mediums. For example the ATM 10 may include a storage device drive 26 such as a CD-R or CD-RW drive which is operative to accept a portable storage medium 36 such as a write-once or rewriteable CD. For a fee the ATM may be programmed to dispense the sound file by writing a copy of the sound file on a user supplied CD. Alternatively, the ATM may include a supply of blank CDs or other media, and may copy the file onto the media and deliver it to the user. Examples of other types of storage device drives that are operative for use with embodiments of the present invention may include portable hard drive readers such as an Iomega Jaz® drive; magneto optical drives such as an Iomega Zip® drive; flash memory drives for writing to flash memory devices such as CompactFlash and Sony Memory Stick®; DVD-R, DVD-RW, and DVD-RAM drives, Mini-CD drives, and digital tape drives.

Alternative embodiments may dispense digital information such as sound files, through an output device which includes a communication port 18 directly to a portable computing device. Examples of suitable communication ports 18 include a Universal Serial Bus (USB) port, a serial RS-232 port, parallel port, an infrared (IR) port, a radio frequency (RF) port such as Bluetooth, an IEEE-1394 port, or a network port such as a wired or wireless Ethernet connection. When a portable computing device such as a Diamond Rio is connected to the port 18, the ATM may be operative for a fee to download MP3 sound files to the RIO MP3 player. Examples of other types of portable computing devices that may receive dispensed digital information such as sound files include a portable computer such as a notebook computer, a personal digital assistant (PDA) and a mobile phone.

Alternative embodiments may be operative to dispense digital information to a user through the Internet by e-mail or FTP for example. In such embodiments the user may select the information through inputs to the ATM 10. The ATM would prompt the user to input through at least one input device an e-mail, FTP or other network delivery address. The ATM would then be operative through an output device such as a suitable network interface, to e-mail or FTP the selected digital information to the user, rather than dispensing the digital information through output devices, to a portable storage medium or to a computing device adjacent the ATM. Alternatively the ATM may send one or more messages through one or more networks to a remote computer, which messages cause the remote computer to send the selected digital content to the network address.

Figure 3:
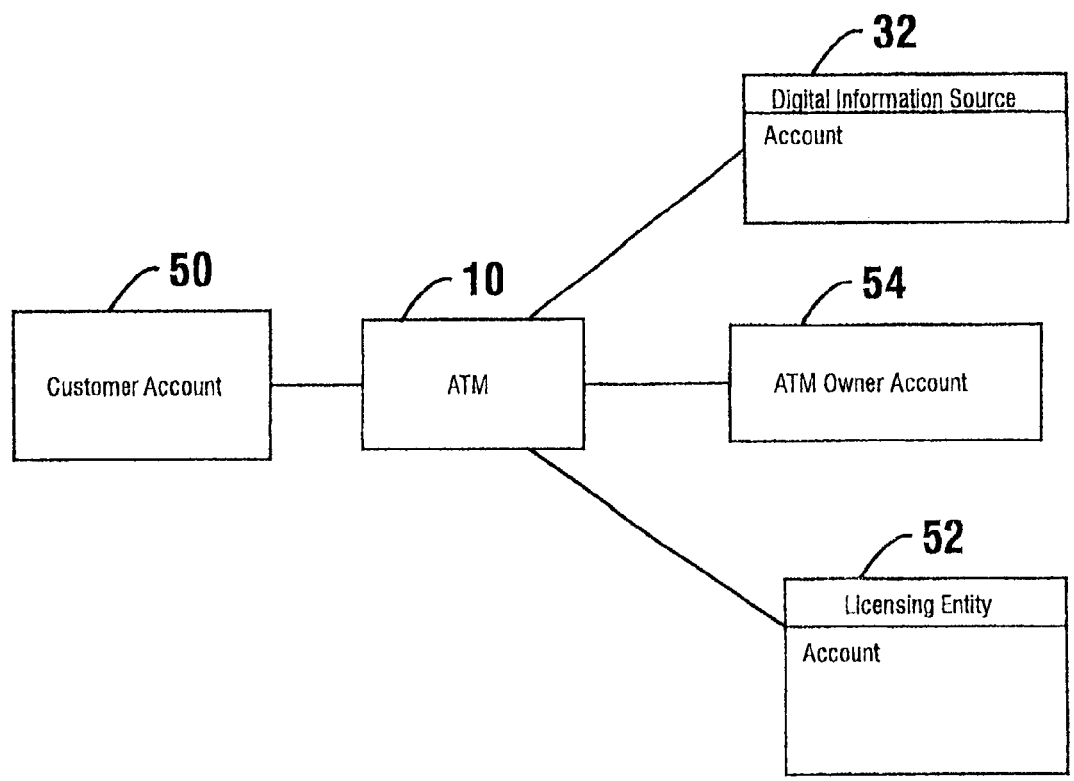
FIG. 3 is a schematic view representative of the distribution of transaction fees from digital information dispensed by an ATM.

FIG. 3 shows a schematic view representative of accounts that are accessed by the exemplary ATM 10 for distributing user fees. Because the ATM 10 is in operative connection with a host banking system or other system for settling accounts, ATM 10 is enabled to deduct a user fee from an account of the user in exchange for the dispense of digital information. The exemplary embodiment of the ATM 10 operates by reading an account number from a card inserted by a user into the card reader 20. The account number includes data representative of the institution where the user's account is held. Examples of cards that are operative for use with some embodiments of the present invention include credit cards, bank cards, debit cards, merchant cards, smart cards, or any other portable medium that can store account or user information and/or data representative of stored value. The exemplary ATM 10 is operative to communicate with a financial transaction computer which includes or which can communicate with, a host banking system which can validate a user inputted PIN and authorize a transaction requested by the user at the ATM. If the PIN is valid and the transaction authorized, the message (s) sent by ATM 10 is further operative to cause the host banking system to debit user fees from the user's account corresponding to the requested dispense of cash and/or the requested dispense of digital information. Transaction fees or other charges for the convenience of using the machine may also be charged to the user's account. Alternatively as previously discussed, embodiments of the present invention may identify users by biometric information. The biometric data from the user may then be used by a local or remote computer to identify the user and/or their associated account information.

The dispensing of most digital information is limited by the copyright owner. Typically the copyright owner requires a fee or royalty to copy, display, publicly perform or otherwise deliver the work. The amount of the fee may vary depending on how the work is authorized to be used. For example if the work is a sound recording, the fee to play the sound file one time in a restaurant may be much less than the fee to dispense the sound file to a portable storage medium which may be duplicated an unlimited number of times. Consequently, an exemplary embodiment of the present invention is operative to track how digital information is dispensed and to transfer corresponding licensing fees to a licensing entity, a digital information source and/or other entities authorized to receive payment. Likewise stored information concerning the nature, location, size, contract status or other information concerning the establishment in which the particular ATM is located may be used to determine the fee. For example the fee to play a music file in a small restaurant may be less than in a large dance club. Similar principles may be applied to charging for other types of audio files, documents, images, videos, audio-visual files and pay-per-view type events.

The exemplary ATM 10 may be operative to debit a user fee from the user's account 50 for each dispense of digital information. The user fees may be transferred to a common banking account 54 of the operator of the ATM 10. Transfers of user fees may occur either immediately with each dispense and/or may occur periodically with the ATM 10 transferring data concerning multiple charges made to credit cards of various users to a financial transaction computer, such as a settlement host for example, which is operative to credit and debit accounts of the appropriate entities.

Licensing fees for downloading digital information from a digital information source may be transferred in a similar manner. The ATM 10 may generate messages or may include data in messages operative to cause a financial transaction computer to transfer a licensing fee from the account 54 that corresponds to the operator of the ATM 10, to an account of the digital information source 32. Such a transfer may be performed through the host banking system or through another transaction switch or through interaction of one or more financial transaction computers. Such transfers may occur with each download or may occur periodically for a batch of downloads which have occurred during a prior time period.

In an alternative embodiment, the ATM 10 is configured with inputs which include a terminal identifying UserID and a password for use when connecting through one or more networks to the digital information source 32. The UserID and password enable the ATM 10 to access the digital information source 32 and to download digital information. The digital information source 32 monitors all downloads that correspond to the UserID and periodically charges the account 54 that corresponds to the operator of the ATM. Alternatively for some types of digital information, the charge may be assessed against an account of the establishment where the ATM is located or an account of the operator of the establishment. This may be appropriate in cases where the use associated with the digital information, as indicated by the transaction messages received from the ATM and/or based on stored data, is a public display or performance of the work in the establishment. Of course other approaches may be used.

Once digital information has been downloaded to the data store 13 of the ATM 10, the copyright owner of the digital information may require that a licensing fee be paid with each dispense of the digital information to a user or upon each public display or performance. The ATM 10 or other connected computer is operative to keep records of each dispense of digital content and the character of dispense that is made. The exemplary ATM is further operative to transfer licensing fees associated with each dispense to an account of the digital information source 32 or another licensing entity 52 through the financial transaction computer. This transfer may be done with each dispense or periodically for a batch of dispenses.

In an alternative embodiment, the ATM 10 may be operative to transfer dispense records to the digital information source or the licensing entity through the Internet or other network. The digital information source 32 or licensing entity 52 may then debit or charge the licensing fees from an account that corresponds to the user, the operator of the ATM, the operator of the establishment or other appropriate entity.

For digital information that includes copy protection features or other technological measure to limit reproduction, access or use of the copyrighted work, the ATM 10 may be further operative to configure or incorporate the protection features and charge a user fee that corresponds to the copy or other protection features which are included. For example ATM 10 may be enabled to have the user select licensing features of a song file such as unlimited or restricted duplication, expiration dates, or other features of the sound file that affect the reproduction or use of the sound file. For example, the protection features used in some embodiments of the invention may restrict reproduction of the digital content so that it may only be played in the portable computing device to which it is initially delivered. Other features may restrict reproduction by preventing the digital content from being transferred from or otherwise reproduced in digital form from the media or device on which it is initially delivered. Other features may restrict reproduction by limiting the use of the digital content to a particular time period or to a particular number of plays. Of course additional or alternative approaches may be used depending on the system and the digital content involved. The ATM 10 may be operative to charge the user a corresponding user fee based on the type of protection features selected. The ATM may also be operative to cause the corresponding licensing or other fee to be paid to the source of the digital information or a licensing entity.

Alternative embodiments of the present invention may be used in connection with systems which include stored information concerning particular users. Such systems may be used to correlate the identity of the user with marketing or customer preference data. Such information may include particular categories of music, videos, books or other materials or products that can be provided and/or that are of interest to the particular user. The ATM may operate to automatically give the user options for selections tailored to their associated preference information. Alternatively such information may be used to automatically provide the user with digital files, visual or audio outputs or other outputs whenever the user operates an ATM connected to the system. For example when the ATM is operated as a jukebox, the ATM may operate to automatically display indicia corresponding to favorite artists or songs, or to output one or more of the user's favorite songs.

In certain embodiments it may not be desirable for a user to access their financial account each time a relatively small charge for digital information is assessed to the user. In such systems the system may be configured so that the user is required to make a "minimum purchase." This amount may be a charge reasonably sufficient to offset the costs of accessing the account, for example $10 or $20. This amount would then be credited to a content prepay account associated with the user. A prepay account record indicating a credit associated with the user or their account would then be stored in one or more data stores. This credit information may be stored locally on a smart card or other item, at the ATM or remotely in a computer such as a financial transaction computer which can be accessed from the ATM. For example in some embodiments the amount may be credited to a licensing or other organization. Alternatively, a financial transaction computer may debit the prepay account of the user as it is used and route payments to the appropriate entities. The amount of value associated with the prepay account may then be reduced each time the user receives a delivery of digital content until the account is exhausted. Such a system may be advantageously used where the fees involved in each digital file transaction are small, such as the cost or playing sound files. Such a system also provides the system operator, licensing entity, or other entity the benefit of the "float" which is the ability to generate revenue by earning interest or other forms of income on the allocated funds.

To discourage or limit the unauthorized reproduction of digital information that may be dispensed, exemplary embodiments of the present invention may be operatively programmed to modify features of the digital information before it is delivered for reproduction on a portable medium and computing device. For example with digital sound files, the processor in the ATM comprises a reproduction device that may operate to embed a digital code or certificate in the sound file that is reproduced on the user's portable digital sound player or other personal computing device. Such a certificate may further include an encrypted digital signature that can be used to detect unauthorized alterations of the file.

The portable sound player would only be operative to play the sound file if the digital certificate corresponds to a unique code or certificate associated with the portable sound player. Also the portable sound player would only be operative to play the sound file if the digital signature indicates that the sound file is authentic. Such features would limit playback of the file to the user's personal sound player. The sound file would be inoperative on another personal sound playing device that is associated with a different certificate or code. Of course the same principles may be used with files that are downloaded to the ATM itself for storage in the local data store, when the files are intended only to be played through use of the ATM and not transferred to other devices.

In alternative embodiments the ATM may be operatively programmed to have the user register with a licensing entity for the digital content prior to dispensing digital content for the first time. During the registration process the user would be associated with a unique license code that may also be used when purchasing digital content in the future. The ATM may then be operative to embed the license code in each file that is dispensed for the user. The next time the user wishes to purchase digital information, the ATM may then be operatively programmed to accept the input of the license code from the user.

For example the license code may be manually input with the input device 16, read from a card with the card reader device 24, downloaded from the user's portable computing device 38, retrieved from another source and/or correlated with other data concerning the user. The ATM would then be operative to validate the license code by communicating with the licensing entity. If the license code is valid and/or is in good standing, the ATM would be operative to dispense additional digital information with the embedded license code of the user. Such a unique license code may be generated by the licensing organization, or may correspond to the previously described digital code or certificate associated with the user's computing device.

These described methods of copy and/or use protection of the dispensed digital information may be further associated with a subscription service or club. For example during the previously described registration process the ATM may prompt the user to sign up for a digital information service that for a monthly fee enables the user to dispense a certain amount and/or type of digital information. For example the service may correspond to the dispensing of music files or digital book text files. Each month the user would be entitled to dispense a certain amount of these files from the ATM for a discount club rate fee or for no additional fee per dispense transaction.

When the user first signs up for the service, the ATM may be further operative to enable the user to associate payment of the service or club fees to an account of the user for automatic debit of the monthly club dues or dispense fees from the user's account. Such automatic payment information may be acquired by reading account information from a user's credit card or banking card with the card reader device 20 of the ATM.

In an alternative exemplary embodiment, the digital information previously associated with a user may be retrieved from a processor of the digital information. For example the exemplary ATM may be in operative connection with a photographic film processor. A consumer may for example input with an input device 16 of the ATM a processing identification number associated with photographic film being developed and digitally scanned by the film processor. The exemplary ATM is operative to download digital images of the consumer's developed film from the processor which corresponds to the inputted processing identification number. The ATM is further operative to display the images and enable the consumer to select one or more of the images for printing to the printing system 64. The ATM may further enable the user to dispense the images to a physical medium and/or portable computing device of the consumer as previously described.

Figure 4:
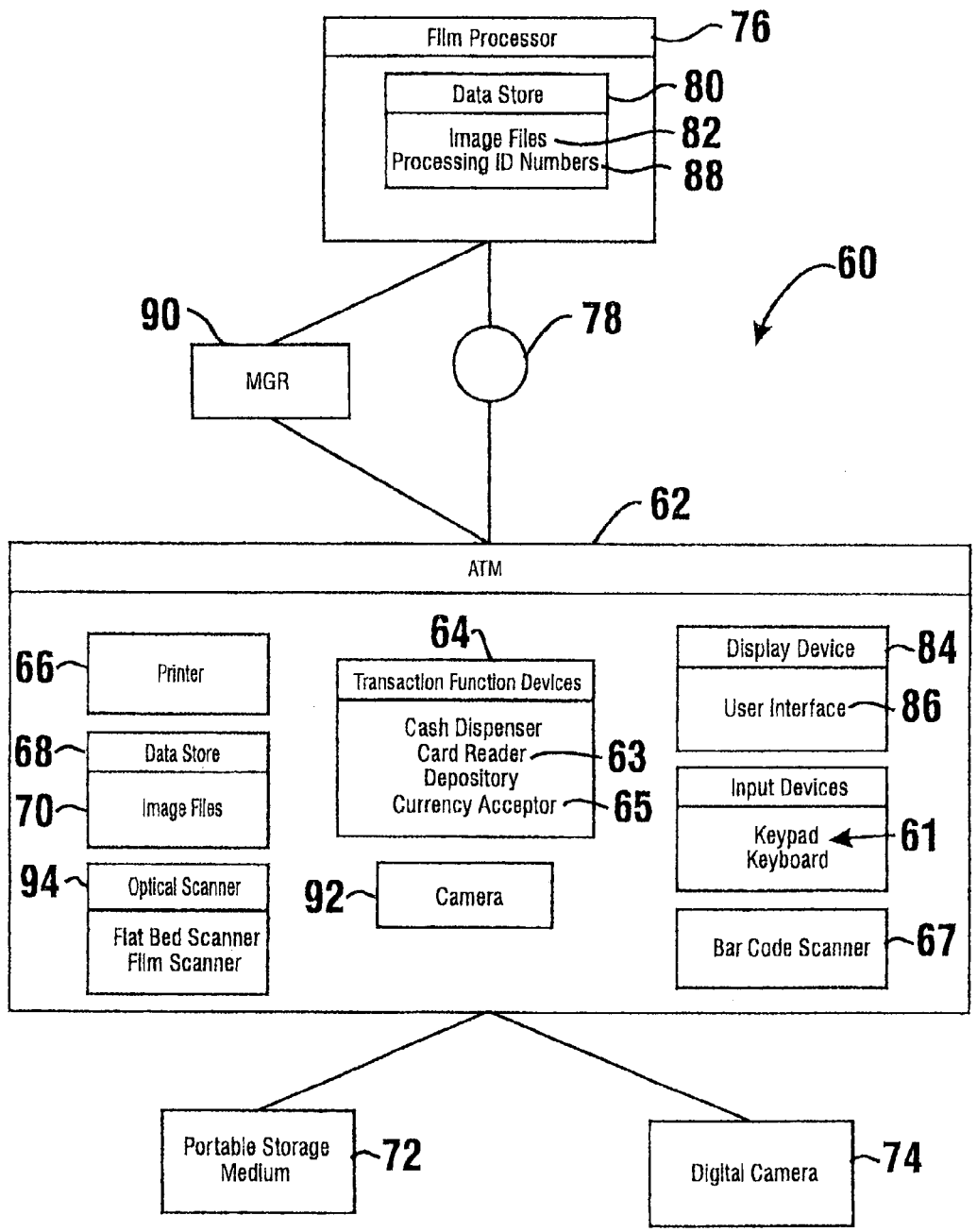
FIG. 4 is a schematic view representative of an exemplary automated transaction machine and system that is operative to print files retrieved from either a portable medium of a consumer or a processor of digital information.

FIG. 4 shows a schematic view of this exemplary alternative system 60. Here the exemplary ATM 62 includes one or more transaction function devices 64 and a high resolution photo quality printer 66. The exemplary ATM 62 further includes a data store 68 that is operative to store a plurality of images files 70. The exemplary ATM 62 is operative to acquire image files 71 from a plurality of different external image file sources. The image file sources for example may include a portable storage medium 72 that is placed in operative connection with the ATM 62 by a consumer. The image file sources may further include a digital camera 74 that is placed in operative connection with the ATM 62. In addition the image file sources may include one or more film processors 76 in operative connection with the ATM 62 through a public or private network connection 78. In an exemplary embodiment the network connection includes the Internet.

To use the described exemplary ATM to print images originally captured on photographic film, the consumer first forwards the exposed film to a film processor 76. Exemplary film processors may for example receive film sent through the mail by the consumer and/or may receive film that has been dropped off at a film processing booth located at a store or other convenient facility. To facilitate tracking of the film, a processing identification number may be forwarded to the film processor with each individual roll of film. For example, each film being dropped off at a booth or being sent through the mail may be placed in a shipping envelope or other container supplied by the film processor. Each shipping envelope may include a unique processing identification number such as a film processing number preprinted on the shipping envelope. The shipping envelope may further include a tear off receipt that includes a matching film processing number. The film processing number on the receipt may then be inputted into an ATM to retrieve and print one or more of the images developed by the film processor.

In alternative exemplary embodiments, the processing identification number may correspond to a processing account number for a film processing account previously established by the consumer with the film processor. When sending in film to be developed, consumers may record their processing account numbers on a shipping container for a roll of film. If a consumer has multiple roles of film, each may be associated with the consumer's processing account number prior to sending to the film processor. The processing account number may then be inputted into an ATM of an embodiment of the present invention to retrieve and print one or more of the images developed by the film processor.

When film is received by the film processor 76, the film is developed and digitally scanned to produce image files 82 representative of the images exposed on the film. The film processor 76 is further operative to store the image files 82 in a data store 80 for later retrieval by one or more ATMs 62 of this described exemplary embodiment. In the exemplary embodiment, the image files 82 in the data store 80 are associated with the previously described processing identification numbers 88 such as a film processing number or a processing account number of the consumer.

The exemplary ATM 62 provides a user interface 86 through a display device 84 of the ATM which enables the consumer to retrieve image files generated by the film processor. To facilitate the retrieval of the image files from the film processor 76 which correspond to the consumer, the exemplary ATM 62 is operative to prompt the consumer to input one or more processing identification numbers 88 which are associated with the image files 82 stored in the data store 80 of the film processor 76. In one exemplary embodiment the processing identification numbers may be inputted though a keypad or keyboard 61 of the ATM 62.

In alternative embodiments, the exemplary ATM 62 may include a bar code scanner 67 that is operative to scan and input the processing identification numbers from a processing receipt, account processing card, label, or other medium in the possession of the consumer. In this described exemplary embodiment the processing receipts, or account processing cards may include a bar code or other machine readable indicia which enables the scanner 67 to quickly and accurately scan and input the processing identification numbers into the ATM. In a further alternative embodiment, the exemplary ATM 62 may include a card reader 63 that is operative to read processing identification numbers from a magnetic stripe card or a smart card previously issued to the consumer. The exemplary ATM 62 may further prompt the consumer to enter a password or personal identification number (PIN) that is associated with the processing identification number stored on the card.

The ATM 62 is operative to contact the film processor 76 and forward the inputted processing identification numbers and/or PINs to the processor 76. In response to receiving the inputted processing identification numbers and/or PINs, the film processor is operative to validate the inputted processing identification numbers and/or PINs. Validations may include for example whether an inputted processing identification number corresponds to received rolls of film and/or whether the inputted processing identification number matches the inputted PIN. If the inputted processing identification numbers are valid, the film processor is operative to forward one or more image files 82 to the ATM 62 which correspond to the inputted processing identification numbers. The image files 70 received by the ATM 62 are saved in the data store 68.

When the film processing number does not correspond to image files stored in the data store 80 of the film processor 76 or the inputted processing identification number does not match the inputted PIN, the film processor is operative to send the ATM 62 a message indicative of the inputted processing identification number being invalid. The exemplary ATM 62 may then prompt the consumer to reenter the correct processing identification number and/or PIN.

Once the image files have been received or while the image files are being received, the exemplary ATM 62 is operative to display with the display device 84 a listing of the image files 70. In one exemplary embodiment, the listing may include small thumbnail views of the image files. The exemplary ATM enables the consumer to select one or more of the retrieved images for displaying in a larger size on the display screen 84. The exemplary ATM further enables the consumer to individually select one or more retrieved images for printing by the ATM with the high resolution photo quality printer 66. The exemplary ATM also enables the consumer to individually select one or more image files for saving by the ATM onto a portable storage medium 72.

In addition the exemplary ATM is operative to perform a plurality of image processing functions on image files selected by the consumer. Exemplary image processing functions performed by the ATM may include cropping, red-eye removal, contrast adjustment, sharpening filters, softening filters, color adjustment, or any other image manipulation function which is operative to alter the displayed and/or printed appearance of an image.

The exemplary ATM is further operative to provide the consumer with a plurality of sizing and portrait or landscape orientation options for printing one or more selected images. Sizing options for example may include printing a single 8×10 (inches) image on a single sheet of photo quality paper with the printer 66. Sizing options may further include printing four 4×5 (inches) images on a single sheet of photo quality paper. The exemplary four 4×5 images may be of the same image file or may be selected from up to four different images files. Sizing options also may include printing a plurality of smaller wallet size images of a single or multiple image files. In addition the exemplary sizing options may include custom sizes inputted by the consumer.

The exemplary ATM 62 may be operative to retrieve image files from a plurality of different film processors. In one exemplary embodiment, the inputted processing identification numbers include an address portion that is representative of the communication address of the film processor. The exemplary ATM 62 of the present invention is operative to contact the correct film processor through the network 78 responsive to the address portion.

In one exemplary embodiment, the ATM 62 includes data representative of the communication addresses which correspond to the address portions of the inputted processing identification numbers. Exemplary communication addresses may include a network address such as a TCP/IP address of a server of the film processor. The exemplary communication addresses may further include a phone number of a remote access server of the film processor.

In a further exemplary embodiment, rather than having the ATM 62 include data representative of the communication addresses of a film processor, the ATM may be in operative connection with a message gateway router (MGR) 90. The MGR 90 is operative to establish a communication link between a plurality of ATMs and a plurality of film processors responsive to the address portions of the inputted processing identification numbers. The exemplary MGR 90 is operative to forward inputted processing identification numbers and other messages from each ATM to the correct film processor and return corresponding image files and other processing messages to the correct ATM. An example of an MGR that may be used with the present exemplary invention is found in U.S. Pat. No. 6,039,245 of Mar. 21, 2000, which is incorporated herein by reference in its entirety.

The exemplary ATM 62 may include alternative configurations based on the speed of the connection between the ATM 62 and the film processor 76. For example large high resolution image files may take a considerable amount of time to download from the film processor to the ATM though a low speed dial up network connection. As a result, the exemplary embodiment of the present invention may be operatively configured to initially download relatively low resolution and/or highly compressed "thumbnail" versions of the image files to the ATM 62. The ATM may then output the thumbnails on the display 84 of the ATM 62. Only after a consumer selects a thumbnail for viewing in a larger format, for printing, or for exporting to a portable storage medium, will the ATM 62 send a request to the film processor to download a corresponding high resolution version of the image file to the ATM 62

The exemplary ATM 62 is operative to charge fees to an account of a user or accept cash from the user for the services of printing and/or dispensing the images files. Exemplary ATMs 62 may enable the consumer to pay for printing and/or dispensing image files with a credit/debit card though use of the card reader 63. Exemplary ATMs may further enable a consumer to pay for printing and/or dispensing image files from the ATM by inserting currency into a currency acceptor 65.

The exemplary ATM 62 is operative to allocate portions of the fees received from the consumer among the film processor, the servicer of the ATM, and/or the operating entity which provides space, electricity, and a network/phone connection for the ATM. In one exemplary embodiment the allocations of fees is performed by transferring portions of the fees to financial accounts associated with each one of the film processor, servicer, and operator of the ATM.

In one exemplary embodiment the ATM 62 is operative to charge the consumer for the number of images printed or dispensed to a portable medium. In an alternative exemplary embodiment the ATM is operative to charge fees based on the amount of paper required to print the images. For example a single 8×10 image on a single sheet of paper may cost the same as four 4×5 prints on a single sheet of paper. In a further exemplary embodiment, the ATM 62 is operative to charge a processing fee for the development and scanning of the film and individual printing fees based on the number of images printed or the amount of printer paper consumed. In further alternative embodiments other methods of deriving and allocating fees for the services of printing and dispensing image files from the ATM 62 may be used.

In an alternative exemplary embodiment, the exemplary ATM 62 may retrieve image files from a portable storage medium 72, digital camera 74, or other device of the consumer. The exemplary ATM may then enable the consumer to selectively print, for a fee, individual images with the printer 66 of the ATM 62. As discussed previously, the exemplary ATM 62 may enable the consumer to perform imaging processing function on the images, and may enable the consumer to select the desired size and orientation of the images to be printed.

In addition to printing image files, the exemplary ATM 62 may further enable the consumer to retrieve other printable documents from a portable storage medium 72 or other device of the consumer. Examples of other printable documents, include word processing documents, Acrobat PDF documents, web pages, CAD files, Post Script documents, or any other type of digital content that is capable of being printed to a printer 66 of the ATM 62.

In a further alternative embodiment, the ATM 62 may include a camera 92 securely affixed to the ATM. In this described exemplary embodiment the ATM 62 is operative to enable a consumer for a fee to take digital photographs with the attached camera 92. The digital photos may then be dispensed to a portable medium 72 or printed out with the printer 66 as previously described. In one exemplary embodiment the camera 92 may be integrated into the fascia of the ATM with the lens positioned to photograph individuals or other objects standing in front of the ATM 62. In addition, the ATM 62 may be operative to display a live image of the field of view of the camera 92 on the display 84 of the ATM 62. Also the ATM 62 may display selectable functions with the user interface 86 for optically and/or digitally zooming between wide angle and telephoto views. The ATM 62 may further include selectable functions with the user interface 86 for adjusting the shutter speed, aperture, or any properties of the camera 92 that effect the captured image.

In a further alternative exemplary embodiment, the described ATM 62 may include an optical scanner 94 such as a flat bed scanner or a film scanner, which is operative to generate image files from photographs, slides, and/or negatives. Consumers may use the exemplary ATM 62 to generate image files by scanning pre-existing photographs and/or film with the optical scanner 94 of the ATM. For a fee these scanned-in image files may be printed out with the printer 66 or dispensed to a portable medium 72 as previously described.

The computer processors in the exemplary ATMs 10 and 62 operate to perform processes described herein responsive to software stored in one or more data stores, such as data store 13, 68. The software stored in data store 13 is loaded or stored therein from one or more forms of programming media. Such programming media may include any media or article from which computer instructions can be copied or read by a computer such as one or more CDs, diskettes, hard drives, tapes or other items.

In an alternative exemplary embodiment, an ATM may assist a user in ordering goods. For example, the automated transaction machine can have user friendly operating instructions for making purchases. The machine may also provide a variety of payment options.

Some persons may be without bank cards, credit cards, or debit cards. These persons may be without credit or are uncomfortable with the technology involved therewith. Still other persons, for reasons which may be unknown, prefer to carry out their transactions with cash (i.e., bills or coins).

An exemplary embodiment enables a user to use cash as payment for their goods order. The automated banking machine, such as ATM, may have a cash accepting device. That is, the machine is capable of permitting cash based network (e.g., Internet) purchases. Thus, the exemplary embodiment provides for a user to shop online, yet pay with cash. Furthermore, the user is not required to own a network accessible computer to carry out the shopping. Additionally, the system may be arranged so that a user may or may not have a preexisting account associated with the particular machine. Thus, an exemplary system may permit walk-up online shopping to any user capable of paying cash for their purchase.

An ATM may permit a user to browse a web site, select one or more items, and proceed to checkout. At this point the user may insert a cash amount, corresponding to the purchase price of the item(s) and any additional user fee, into the ATM. The ATM may operate to verify the cash amount and then forward information to the web site to complete the purchase.

The ATM may be arranged to require the user to input cash either prior to permitting a user network access or after network access, or after receipt by the machine of a particular message such as after payment is requested from the web site. The ATM may provide billing information to the web site prior to or after checkout. The ATM may be programmed so that an account of an entity who is not the consumer, such as an administrator (e.g., owner, leaser, renter, or operator) of the ATM could be charged or debited the amount of the goods ordered. Although the administrator could use the machine, the administrator would generally not be the user who provides the value to the ATM to pay the price or amount for the associated goods or services.

The ordered product could be delivered to an address (e.g., physical or digital) provided by either the user or the administrator. Of course in some embodiments the merchant may also dictate where and when the product may be received. For example, the machine may be located in a warehouse facility and the product is delivered to the facility for pickup.

The machine may include a printer and the user may be presented a receipt for amounts input and/or the product purchase. The receipt may be used to pick up the product after its delivery to a location other than the user's address. For example, a product ordered from a Target® store may be available for pick up at a selected Target® store. Alternatively, the system may be such that the user may pick up the goods at any Target® store.

It should be understood that the term online in this disclosure relates to any network or combination of networks that the machine may access (directly or indirectly) to enable a user to remotely purchase goods. For example, a private network, public network (such as the Internet), virtual private network, intranet, or a local network may be considered online. The products and services available for purchase may be dictated by the products and services available online. As previously discussed, the products may be in physical or digital form. The services may be intangible, such as game playing. Additionally, the services may include for example, Internet gambling, fee based adult content sites, off-track betting on sports, horses, dogs, etc., lottery games, fortune telling, fee based web sites, utility payments and charitable donations.

In some embodiments the user may need to initially register with the system. The ATM may present a series of queries to obtain one or more identifying inputs from the user so that the ATM may operate in conjunction with the host to set up an account for the user to facilitate future use of the ATM. The account may be associated with user information, such as address or delivery information. Other information associated with the account may include demographic information. The account may be correlated through operation of one or more computers with another account of the consumer such as a bank account, credit card account or line of credit. The information may be used by the administrator of the ATM to provide more ready use and quicker online set up of the machine for that particular user during a subsequent use. For example in some embodiments a user may operate the machine to pay amounts for goods or services in a plurality of separate sessions, between which there are time periods in which other users conduct transactions at the machine. Other uses of the information may include the presentation of specific advertising targeted to that particular user. For example, the advertisements may be provided on a display screen during waiting periods.

In some embodiments an automated transaction machine may be affiliated with one or more online retailers. These retailers may include in their web interface an additional payment option at checkout. For example, the payment option may be "ATM". This option may be in addition to credit card, debit card or other options that may be used to make payment from a PC. Upon selecting the "ATM" payment option the user would next be required to feed the needed amount of cash into a cash or currency accepting device of the machine. An exemplary cash accepting device is shown in U.S. Pat. No. 6,520,408, the disclosure of which is incorporated herein by reference. The machine may include a valuation device in operative connection with the cash accepting device that operates in conjunction with the computer to check the fed amount against the needed amount. The validation device may be of the type shown in U.S. Pat. No. 5,923,413, the disclosure of which is incorporated herein by reference. After making a comparison of the fed amount is at least as great as the associated price, the machine could notify the merchant that the purchase should proceed. This may be done for example by sending one or more messages, such as a confirmation message to the merchant through a network. Of course, at other stages of the purchasing process, the machine itself could present the user additional choices of payment. For example, at the stage of checkout the machine may offer the user a lower purchasing price if the user elects to pay by credit card or debit card instead of cash, or vice versa.

Additionally, a customer using a computer not associated with an automated transaction machine may be able to reach the checkout payment options at a retailers web site. The programming associated with the server operating the merchant site may be such that the "ATM" payment option (or another distinct option) may be layered to permit the customer to save the order information to enable later payment at an automated transaction machine. For example the customer may be given a code or password that is associated with and which enables the ATM to operate to retrieve the previous order information. A user of the ATM may then quickly contact the web site, insert the necessary code, and complete the payment. The machine operates to cause the amount paid by the user to be allocated towards payment for the ordered goods. This may include in some embodiments, the merchant receiving payment through the machine operating to cause the merchant to be provided with an account of the administrator, the administrator being charged for the order, and the administrator retaining the cash deposited in the machine. Alternatively or in addition such allocation may include the machine causing an electronic transfer of funds from the administrator to the merchant to pay for the order. Of course various approaches may be used to allocate the cash the user provides to the machine to the payment required to be made corresponding to the order. The described exemplary arrangement may reduce the time necessary to make a purchase because the customers would already have a general or exact idea of how much their purchase will cost. Thus, the user could hold a sufficient amount of cash before using the machine. The arrangement also permits a customer to place a preliminary order and save the order information when a cash accepting ATM is not immediately available to the consumer. Alternatively the ATM may also be programmed to receive a customer's code or other identifying data, contact the vendor (either online or offline), and (after receiving the user's cash) complete or consummate the order without the user having to again navigate through the retailer's entire web site or other order interface.

In exemplary embodiments an administrator of the ATM may be required to oversee payment to the merchant (or web site) for the cost of the ordered goods. The administrator may have an account billed for later payment. For example, the administrator may receive an itemized periodic bill from a particular merchant relating to online purchases paid for via the ATM. Other payment options may include the immediate transfer of funds from an account of the administrator or a third party on behalf of the administrator, to an account of the merchant. Alternatively the administrator may have an open running account with an affiliated merchant. In other embodiments third parties may serve a clearing house between merchants, ATM operators or other entities who receive cash or other value allocated to orders.

In some embodiments an administrator may receive revenue from fees charged to the online retailer (which may be similar to credit card fees), from advertising, and/or from user fees. The administrator may also receive a certain percentage of the purchase price of the goods from the retailer for enabling the user to purchase from that retailer. Furthermore, the retailer may pay access fees (e.g., IP, DSL) to the administrator for the network access time. Of course other revenue may be generated based on other arrangements with retailer or web sites, such as providing links to related web sites which may be of interest to particular users.

Other revenue generating arrangements may also be implemented in some embodiments. For example, the user may be required to pay a cash user fee for an initial time period during which services are provided. The time period, which may be extendable by additional payment, could permit the user to browse the Internet or a selected online collection of web sites or in an online catalog as desired while compensating the administrator for the network access. The user fee may also be of such an amount that it would enable the administrator to recoup costs associated with permitting the user to use the machine without making a purchase. The user fee could be refunded (or credited) toward the cost of purchased goods or services if the user actually makes an online purchase.

In some embodiments the ATM may be operatively programmed to calculate a price associated with an order. This may include for example the computer being operative to cause the calculation either at the ATM and/or at a host, of a price which is a function of an amount required to be paid to the merchant plus added fees. These fees may include for example, service charges, access charges, taxes or other amounts that the consumer is required to pay related to the purchase. The computer may then operate to cause the order to be entered or confirmed by sending one or more messages through the appropriate network.

In some embodiments the ATM may be operated to accept multiple payments from a user during separate transaction sessions. For example, the machine may be programmed to accept multiple payments from a user toward a particular order. This may include the user making weekly payments for example toward an order. The may include for example, advance payment for utility services, payment of rental charges or other fees, or the user paying so much periodically toward particular goods or services. In some embodiments the orders may be associated with a standing arrangement between a user and a provider of goods or services and an order placed through the ATM may identify that arrangement rather than initiate it. In some embodiments the user may have a preestablished account which may be associated with the user or their transactions and which may be used in operation of the machine and system to allocate the user's payments to the particular order. The account may be associated with a card, a code or biometric feature for example. In some embodiments the machine may be operative to open an account for the user by the user providing one or more identifying inputs through one or more input devices of the machine. The machine may operate to cause the value of cash or other items input by the user to the machine to be credited to the account. The machine may operate to cause appropriate electronic records to be produced and/or to provide the user with appropriate statements such as by printing receipts indicating full or partial payments made, or other status information. In some embodiments an account may be debited through the system either for the full amount or for partial amounts responsive to deliveries of goods, services or use. In some embodiments the machine may be further operative to cause the user account to be closed after the order has been transmitted and the amount therein debited. Of course various approaches may be used based on the nature of the transaction, goods or services ordered.

In some embodiments a delivery address for the items associated with the order may be input by the user at the ATM or in advance by the PC. Alternatively the machine may be programmed to provide the address specified by the administrator. This may be for example a location where the consumer may take delivery of items ordered.

In some embodiments cash equivalent payments may be accepted by the ATM. For example, the ATM may include a money order or check verification system. Thus, the machine could accept a check or money order in lieu of cash. The machine could then credit the user an amount equivalent to a cash payment. Further the ATM may be operative to dispense to the user any change representing the excess of value input above the price for a given order. For example the ATM may include features described in allowed U.S. patent application Ser. No. 09/633,486 filed Aug. 7, 2000, the disclosure of which is incorporated herein by reference.

Furthermore, in some embodiments the machine may be arranged to accept combinations of different types of payment. The machine could accept a partial credit card payment and a partial cash payment for the same purchase. For example, a user may desire to purchase goods with a credit card that is near its credit limit. The user could select to the pay a specific amount with the credit card and the remainder with cash. Thus, another payment option would be related to a "combination payment". This may be desirable for example when the user desires to charge part of the items purchased to a card used for business and wishes to pay cash for personal items.

As discussed herein, the apparatus and method of an exemplary embodiment permits use of a cash accepting automated banking machine to make an Internet or other online purchase. The user of the machine pays the machine cash for the goods purchased. The machine's administrator is responsible for the payment to the merchant. Thus, the machine may act as an intermediary in allowing a consumer to purchase online goods from a seller. It should be understood that a user with a bank or credit card account may also have access to all of the previously discussed features associated with the ATM such as paying for orders via credit or debit card account. In some embodiments the ATM may be operative to carry out cash dispensing transactions in which the value of cash dispensed is assessed to the user's account. Furthermore, the ATM may be a cash recycling ATM such as described in incorporated U.S. Pat. No. 6,520,408. This enables the ATM to dispense cash previously received as payment for online purchases to users of the ATM making cash withdrawals. It should also be understood that the term "goods" may be applied in the singular or plural. For example, a "goods" may constitute only a single item or a plurality of items.

Figure 5:
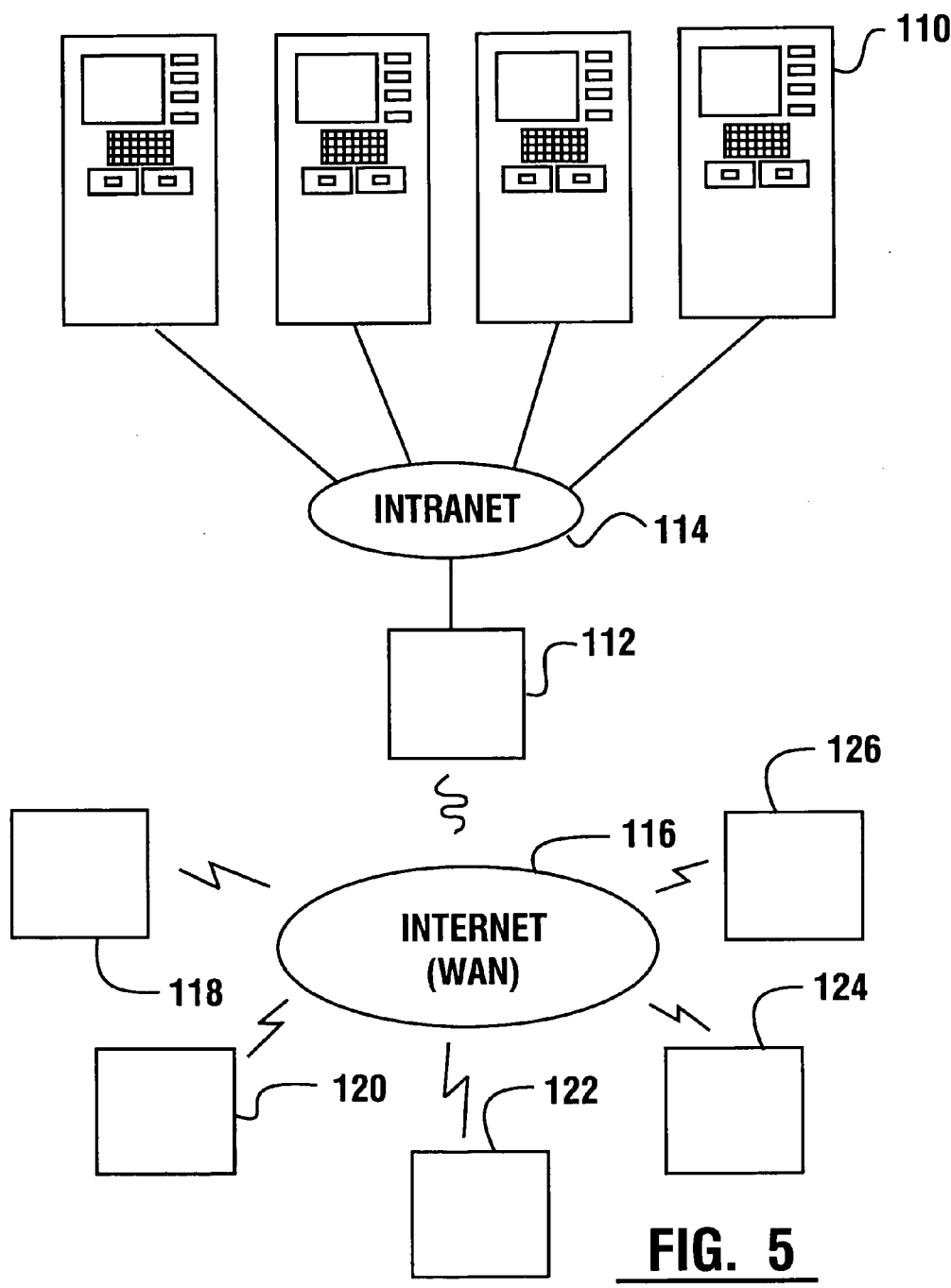
FIG. 5 is a view representative of an arrangement that is operative to permit cash payment for goods ordered through a network.

FIG. 5 shows a view of an exemplary system arrangement permitting cash payment for goods or services purchased online. A plurality of automated banking machines 110, such as ATMs, are shown connected to a computer system 112 of a home host, such as a home bank or merchant. Home host computer system 112 is operated by the bank or other entity which has primary responsibility for the ATMs 110. An ATM 110 may include a cash acceptor device and other components and features as previously discussed. Certain ATM transaction function devices and the operation thereof is disclosed in U.S. Pat. No. 6,273,413, the disclosure of which is incorporated herein by reference.

ATM host computer system 112 is shown connected to the ATMs 110 through a network 114. The network 114 may be a local or proprietary network that may provide communication between the computer system 112 and the machines 110 using messages in the transmission control protocol/internet protocol ("TCP/IP") format. The messages that are communicated through the network 114 may include TCP/IP messages and hypertext mark up language ("HTML") or other mark up language documents.

Home computer system 112 is also connectable as shown to a wide area network 116. In some embodiments the wide area network 116 may include the Internet. In other embodiments, other wide area networks may be used. The wide area network preferably communicates messages in TCP/IP between numerous computer systems connected to the wide area network. Thus, a particular ATM may be operable to access a plurality of web sites 118, 120, 122, 124, and 126 associated with the network.

Figure 6:
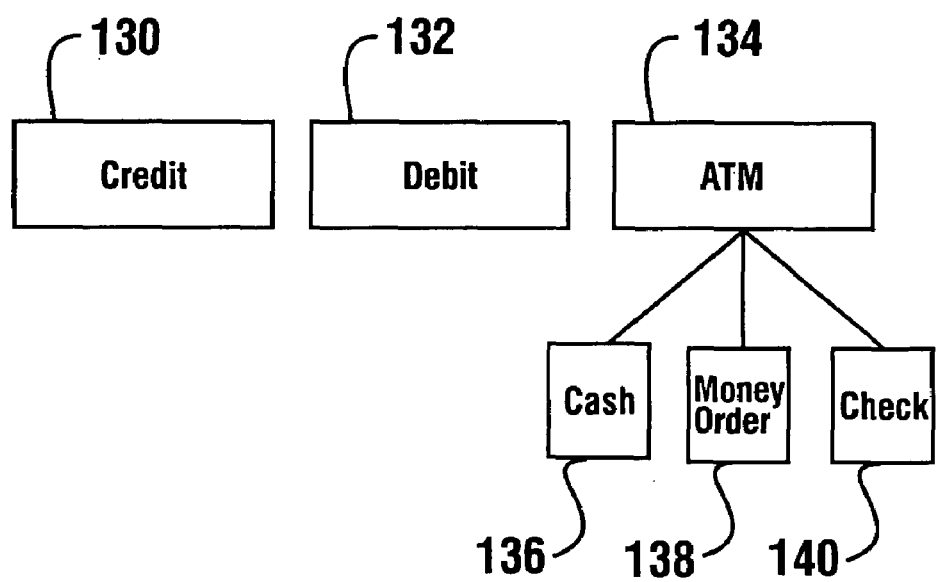
FIG. 6 is a view representative of user payment options.
Figure 7A:
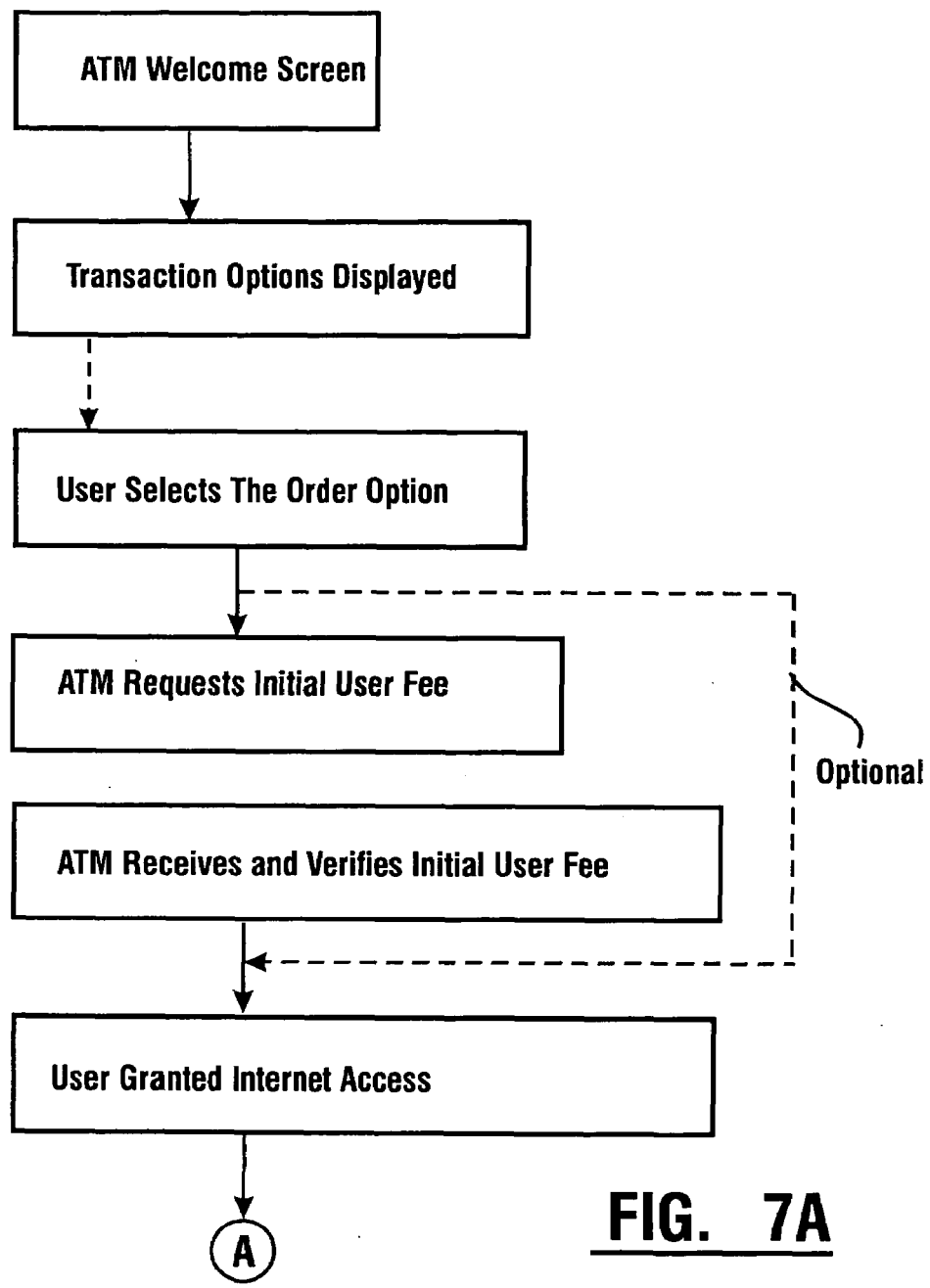
FIGS. 7A through 7E are representative of exemplary steps relating to purchasing of goods.
Figure 7B:
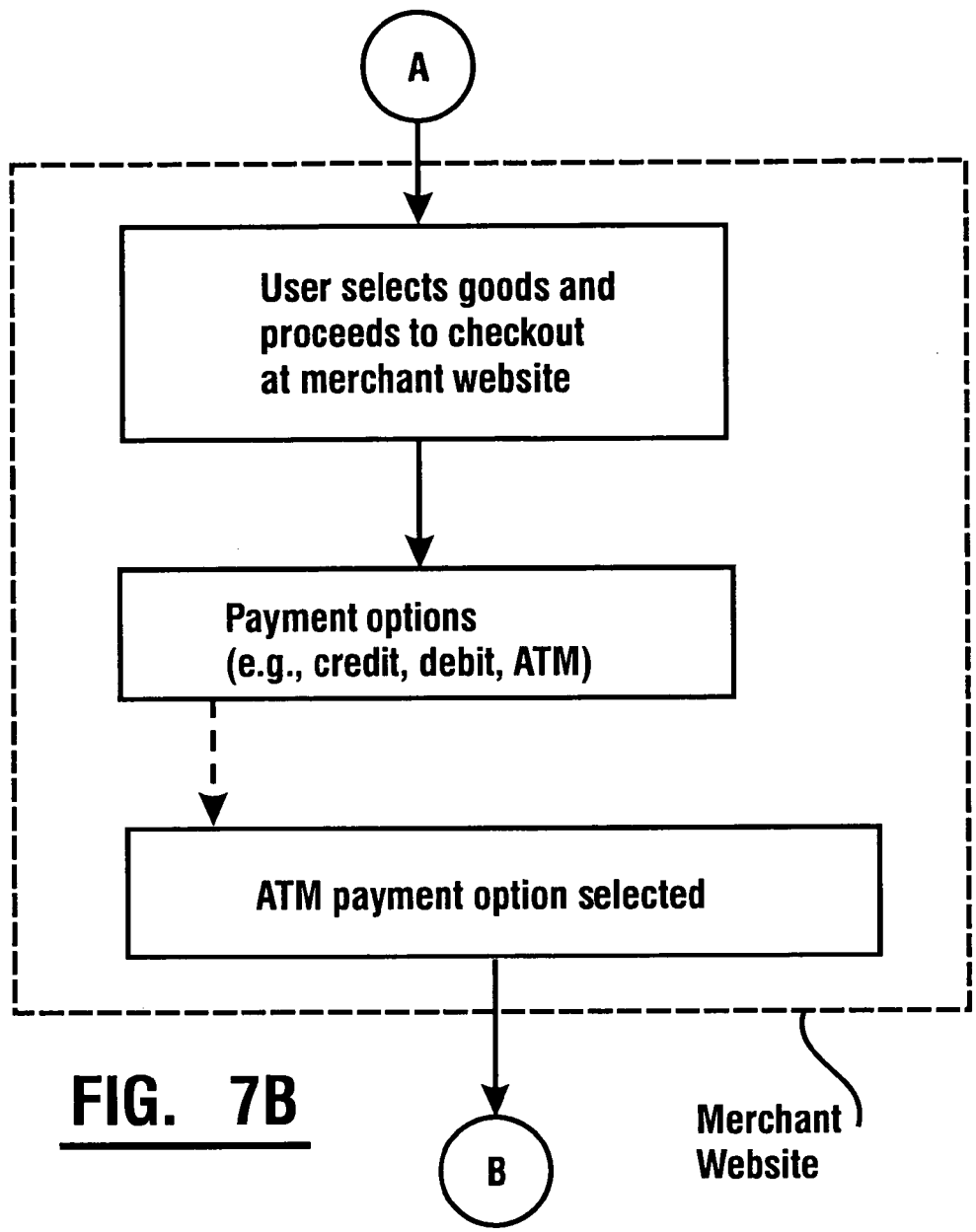
Figure 7C:
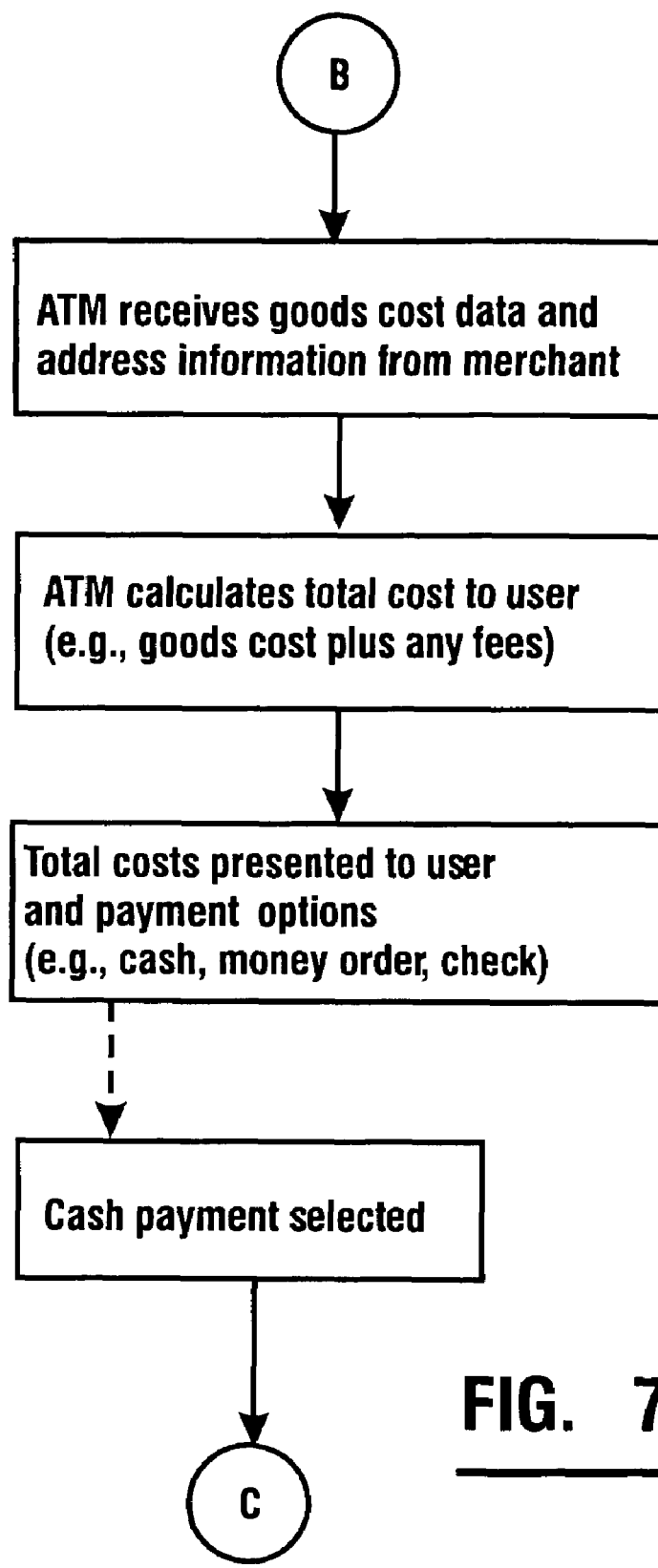
Figure 7D:
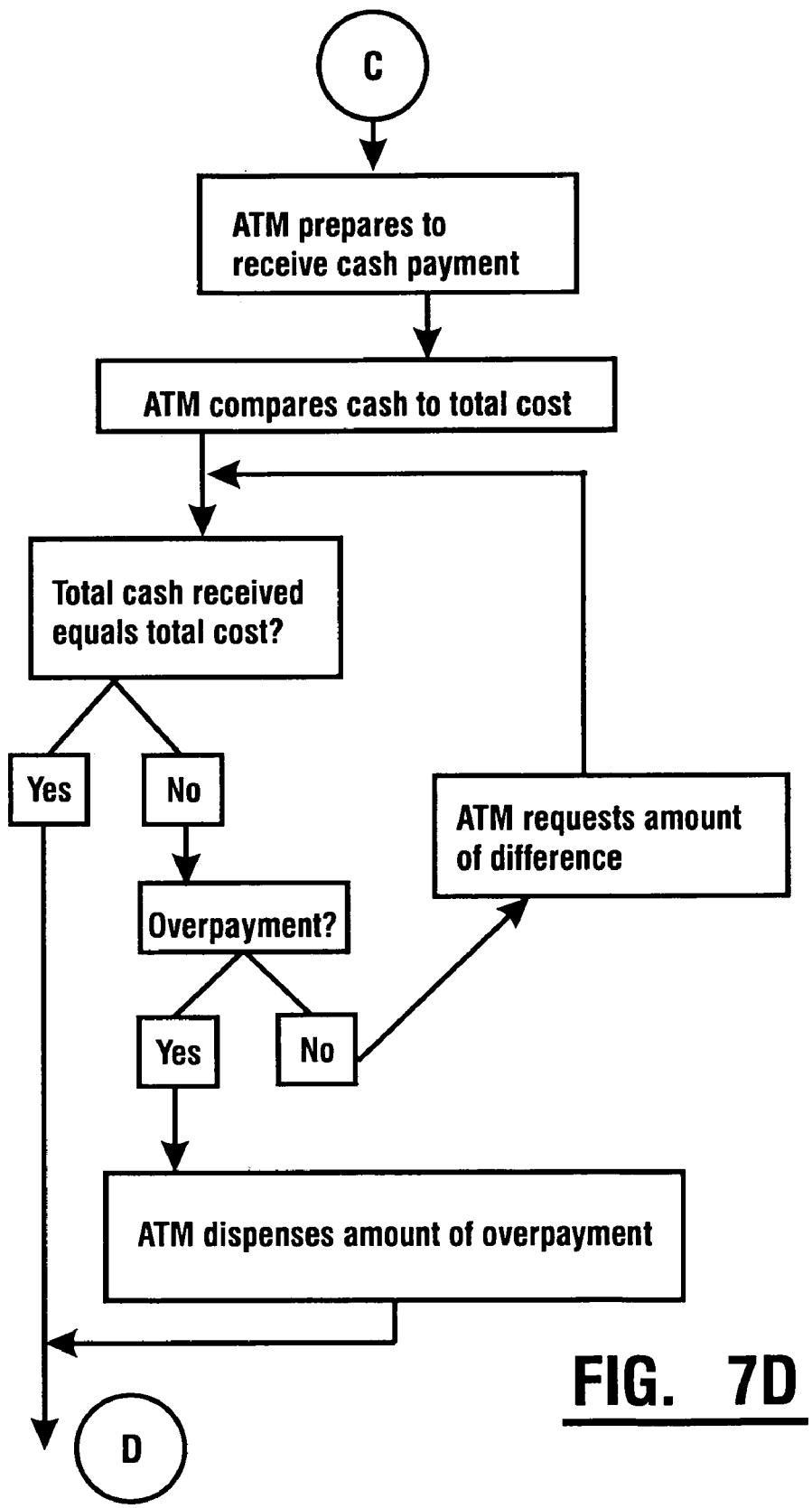
Figure 7E:
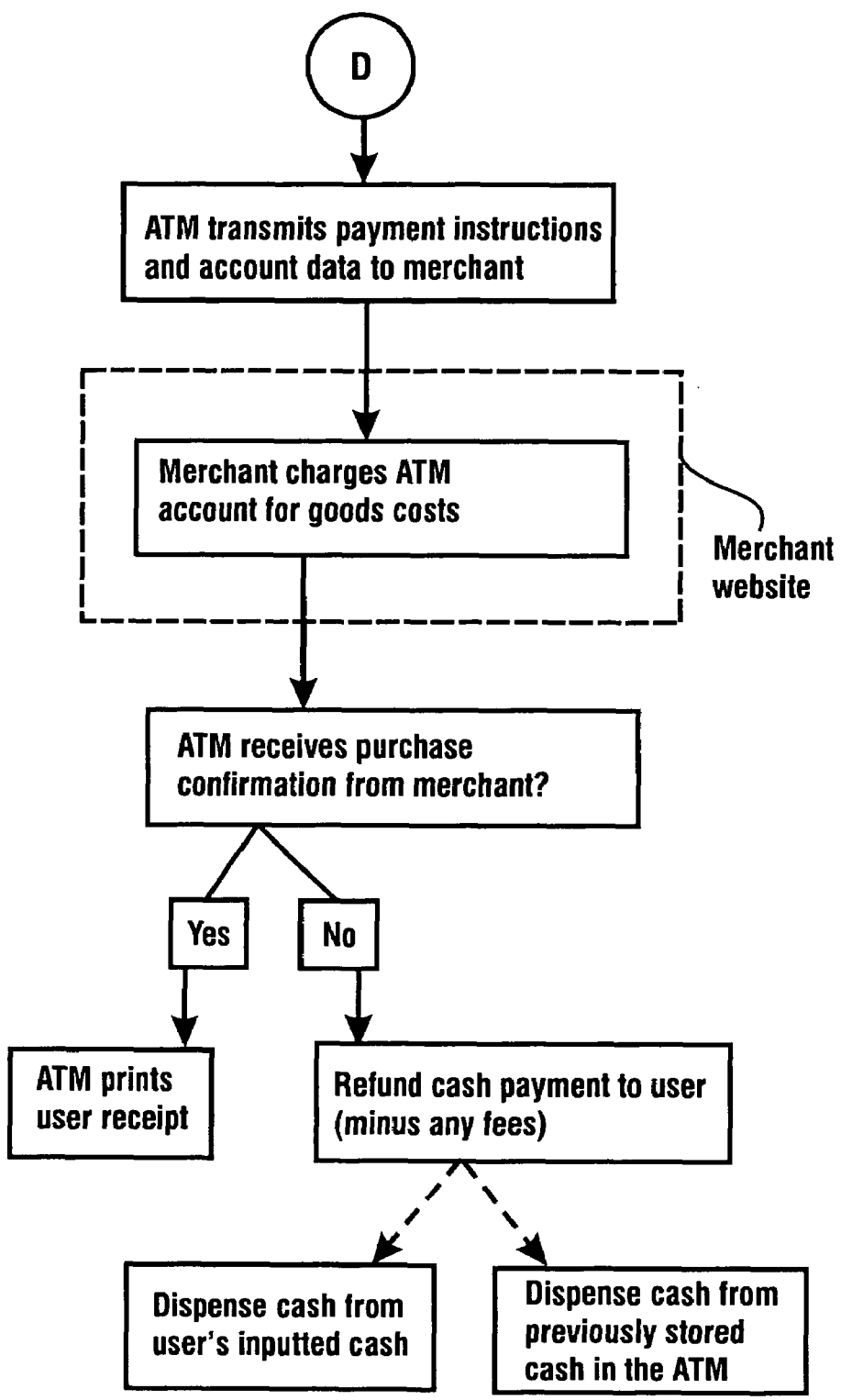

FIG. 6 shows a schematic view of an exemplary display of payment options presented to a user by a web site offering online purchases that can be paid for with cash that is received by an ATM. The payment options may correspond to, be represented by or be associated with buttons or icons on the machine's display screen. The payment buttons may for example correspond to credit card (130), debit card (132), and ATM (134). The machine may include a touch screen device to permit user payment selection by touching one of the payment buttons or icons. A user selecting the ATM payment button (134) may additionally be asked (responsive either the merchant web site or responsive to programming of the machine), such as through the display, whether the ATM payment is by cash (136), credit card (130), debit card (132), money order (138), or check (140). Responsive to the payment selected, the ATM would operate the pertinent devices to cause the machine to receive the indicated payment in the selected manner. For example, responsive to a check payment option being indicated, the machine would prepare to receive the check and operate to make a determination if the check is to be accepted. If a cash payment option is selected then the machine would prepare the cash acceptor device to receive the currency.

FIGS. 7 A-E show schematically an exemplary sequence outline of steps that may occur during the process of purchasing goods from a merchant at a web site with use of an ATM.

It should be understood that in some embodiments an automated transaction machine may be a stand alone machine directly connected to a network such as the Internet without using an intranet. Various forms of communications devices and network connections may be used, including those involving wireless or satellite usage. Additionally, a machine may be configured for ease of modification to use the latest technology relating to faster connection and download times. Some existing ATMs may be upgraded through the installation of computer software to enable processing of a user's order for goods or services as discussed herein. Furthermore, an automated transaction machine may be customized through programming by an administrator, such as a retailer or merchant, to limit or control browsing to specific web sites or other remote access. These specific web sites may pay a fee to the administrator of the machine in exchange for their accessibility.

Embodiments may find applicability to numerous types of situations and may be used to facilitate the tracking of transactions in the entertainment, education, gaming, investment, merchandising and banking industries.

Alternative embodiments may provide for facilitating the delivery of goods or services within an establishment. For example in establishments where patrons commonly encounter waiting time, embodiments may be used to speed delivery of goods or services. For example in popular restaurants during busy periods, patrons may be required to wait a substantial time to be seated at a table. Subsequently once the patrons are seated they then must place their order and wait a further period to receive their food. Such waiting time may be reduced by providing a restaurant web site which includes menu items and enables patrons to place their orders online through an ATM. The patrons can also pay for their food order at the ATM via debit card, credit card, cash, check or other payment method. Variable items such as gratuities may be waived for online payment or a standard gratuity charge may be added.

In an exemplary embodiment, in response to placing their order online through the web site, the user receives an indicator such as a receipt identifying their order and the fact that it has been paid for. The indicator may be in the form of a traditional paper receipt with a numerical or other indicator or indicia that identifies the order. Alternatively the indicator may include additional information such as all the items that have been ordered by the patron. The restaurant's web site in the exemplary embodiment is connected to a system in the kitchen so that the patron's order can be started at the appropriate time. A computer system in operative connection with the web site may also receive inputs through manual input devices or other devices to monitor the seating of patrons in the restaurant so that the patron's order is not started too early. As a result in the exemplary embodiment the patron's order is generally ready to be delivered tableside at approximately when the patron is first seated at their table. This speeds the flow of patrons through the restaurant enabling more people to be served in a timely manner. In the exemplary embodiment if the patron wishes to order additional items such as beverages, desserts or other things that were not included with the original online order, a separate check may be provided and paid for in the traditional manner.

In further alternative embodiments the restaurant web site may be accessible through the Internet by PCs, cell phones or other devices. This enables patrons to place orders for items online from their home or office. Patrons can also pay for such items via credit or debit card or other option that enables payment through a computing device which does not accept cash. In some embodiments the web site may further enable a user to indicate when they expect to arrive at the restaurant. In this way the user may schedule their arrival at the restaurant at a time when their order is about ready to be served. Alternatively or in addition the web site interface may be configured to advise the user of the earliest time that the order could be delivered based on the current number of patrons at the facility. In this way the patrons can place their order and plan to arrive at the restaurant at approximately the time when the order is ready to be served. As can be appreciated in some embodiments the restaurant web site may be combined with the reservation system enabling patrons to remotely make reservations and place orders several days in advance. In addition in an exemplary embodiment because the restaurant has already received payment for the items ordered, the probabilities of a patron not arriving at the restaurant to receive their order is reduced.

Some embodiments may provide considerable detail to the web site concerning specials, recommendations and other information that may be helpful to prospective patrons. Information as may normally be provided by a waiter or waitress concerning food items may likewise be posted on the web site. Further, the ability to take reservations and orders online may facilitate planning by the establishment for demands for food items and reduce the risk that the restaurant will run out of specials or other items that are popular with patrons. Further, exemplary embodiments may provide incentives for advance payment and/or payment with cash at the ATM.

It should be understood that while the exemplary embodiment discussed above concerns a food service establishment, the principles discussed can be applied to other types of establishments. Such establishments may include those where the amount of waiting time encountered by a user may be significant depending on the number of patrons at the facility. Embodiments may also find particular applicability in environments where the goods or services delivered must be customized, configured or assembled together in groups or sets to suit the needs or requirements of the particular user.

In some alternative embodiments the principles of the invention may be applied to a system and method in which an automated banking machine is operated to deliver noncurrency certificates that are redeemable for goods or services. In some exemplary embodiments this may include for example certificates that are redeemable for goods or services at the option of the bearer of the certificate, from a plurality of merchants located in a particular shopping area such as a mall. Further in some exemplary embodiments the certificates may comprise gift certificates of a type that may be provided by a purchaser of the certificate to another person. That person may then use the certificate to acquire goods or services as the recipient desires from the affiliated merchants.

In an exemplary embodiment an automated banking machine and connected systems and networks of the type previously described may be used. In some embodiments the cash dispenser or one or more modular dispenser components of a media dispenser in an ATM may be loaded with gift certificates that have been preprinted and which have a given redeemable face value. For example the machine may be located in a mall and the gift certificates may be printed so as to indicate that the certificates are redeemable by the merchants that are located in the mall for the goods or services such merchants provide. In some embodiments the machine may operate to conduct transactions in which cash is dispensed as well as to dispense a gift certificate at the option of the consumer operating the machine. In alternative embodiments the machine may include a printer device and certificate stock material which may be paper, cardboard or other suitable material. In such embodiments the computer in the machine may be programmed so as to enable the printing of gift certificates on demand within the machine and to dispense certificates to a user. In such embodiments one or more printers located within the machine may be operate to print the associated value on the certificate stock and/or to otherwise print or apply indicia so as to create a valid and/or redeemable certificate prior to the dispense thereof by the machine. Of course in some embodiments certificates may be printed outside the machine, loaded into storage areas in the machine and dispensed in the course of transactions.

In operation a user operating the machine may provide appropriate instructions and identifying inputs to the machine so as to identify the user and/or an associated financial account. The user may also provide inputs to select a transaction including the dispense of gift certificates. The machine then operates in accordance with its programming to cause the appropriate gift certificates to be dispensed and to cause the user's account to be assessed the associated charge. Further the machine may operate in accordance with its programming to cause the associated charge allocated to the user's purchase of the gift certificates to be credited to the account of an entity such as the administrator which may be the mall operator who bears responsibility for reimbursing merchants who redeem the certificates. This may be done for example by sending appropriate messages from the machine through the network so as to cause the transfer of the funds debited from the consumer's account to the mall operator.

In some alternative embodiments in which the automated banking machine includes a cash accepting device, the machine may be programmed so as to operate to accept cash in payment for gift certificates. In such embodiments the user may provide appropriate inputs so as to indicate that they are electing a cash payment option. Thereafter the machine operates in accordance with its programming to enable operation of a cash accepting device and an associated valuation device to determine a value associated with the cash input by the user. In response to the acceptance of such cash value, the machine is operative to dispense the appropriate value of certificates.

Still other embodiments may apply the principles previously discussed in which a person wishing to obtain gift certificates may specify their order therefor at a remote PC or other connected terminal. Thereafter the person electing to purchase the gift certificates may utilize a code or other identifying input used in connection with the initial process to operate the machine so as to recover the data related thereto. Thereafter the user of the machine may utilize a suitable form of monetary value payment to input to the machine such as a credit card, debit card or cash for purposes of paying for gift certificates. Upon payment of the appropriate monetary value, the gift certificates are then dispensed.

In some alternative embodiments, apparatus and systems may be operated so as to enable providing such certificates without the physical delivery of the gift certificates to the purchaser thereof. This may include, for example, a person wishing to give the gift certificates purchased to a third party. In some embodiments this may include purchasing such certificates remotely from a PC or other connected device via an Internet connection. This may include the purchaser of the certificates making payment therefor via credit card, debit card or other noncash payment method. In exchange for making payment, the person purchasing the certificates may be provided with a code or other identifying indicator which corresponds to such purchaser's rights to obtain such gift certificates. Thereafter the purchaser of the gift certificates may transfer the code or other identifying indicator to the individual who the purchaser intends to receive the particular certificates. Such an individual may thereafter go to the machine located in the shopping area and by providing appropriate inputs, including the identifying indicator, receive from the ATM the dispense of the gift certificates corresponding to the amount paid for them by the person who originally purchased them. Of course as can be appreciated the code or other identifying indicators associated with such gift certificates may be provided in various forms and delivered in various manners to the intended recipient. This may include for example various physical and/or electronic forms of the identifying information.

In some examples the merchant web site for ordering such gift certificates may include the capability to automatically dispatch a greeting card to the intended recipient, which greeting card may include the authorization code or other indicia. Such a greeting card may be a suitable hard copy greeting card sent by mail, and may include in some embodiments features selected by the person making the gift certificate purchase during the online session in which the gift certificates are purchased. In alternative embodiments such codes may be included in an electronic greeting card or other suitable delivery form for an intended recipient. Of course these approaches are exemplary and in other embodiments other approaches may be used.

When a recipient obtains the gift certificates they can then be used as the recipient desires in accordance with the applicable terms thereof by redeeming the certificates for goods or services provided by one of the affiliated merchants. The affiliated merchants then provide the redeemed certificates or other suitable information related thereto to the mall operator or other administrator entity who is responsible for reimbursement of the merchants who are redeeming the certificates. Reimbursement is thereafter made by the mall operator or other entity in an amount that represents at least a portion of the face value of the gift certificates. As can be appreciated in some embodiments and methods retailers may be reimbursed at a discount from face value of the certificates so as to cover the cost associated with providing the certificates as well as the ATM used for self service dispensing of certificates and/or associated online purchase capabilities. In the alternative or in addition purchasers of such gift certificates may be assessed a service fee associated with the purchase. It should be understood that such approaches are exemplary and in other embodiments other approaches may be used.

Thus the exemplary systems and methods for ordering goods or services described herein achieve at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function will be construed as encompassing any means known to those skilled in the art to be capable of performing the recited function, and will not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
   (a) operating an automated banking machine to receive from an authorized user of the machine, an order identifier corresponding to an order for at least one item previously selected sans the machine through a web site of an online merchant;
   (b) responsive to the order identifier received in step (a), operating the machine to access a purchase price associated with the order;
   (c) operating the machine to receive from the user on behalf of the merchant, payment for the order, wherein the payment includes at least one of a check and cash;
   (d) responsive to the payment received in step (c), operating the machine to determine an amount of the payment; and
   (e) responsive to the amount determined in step (d) being at least as great as the purchase price accessed in step (b), operating the machine to cause a cash value corresponding to the purchase price to be allocated to the merchant as payment for the order.

2. The method according to claim 1 wherein the machine includes at least one computer in operative connection with at least one reader device, and further comprising:
   (f) prior to step (a), operating the at least one reader device to read user data received from a machine user;
   (g) operating the at least one computer to cause the user data read in step (f) to be compared with authorized machine user data;
   (h) subsequent to step (g), responsive to the user data having a predetermined relationship with authorized machine user data, operating the at least one computer to allow the machine user to use the machine to make payment for the order.

3. The method according to claim 2 wherein the machine includes a payment accepting device, a payment reading device, and at least one input device,
   wherein step (a) includes operating the at least one input device to receive the order identifier;
   wherein step (b) includes operating the machine to communicate with the merchant web site to receive the purchase price,
   wherein step (c) includes receiving the payment for the order through the payment accepting device,
   wherein step (d) includes operating the at least one payment reading device to read the payment received through the payment accepting device,
   wherein step (d) includes operating the at least one computer to verify whether the amount of payment is at least as great as the purchase price,
   wherein step (e) includes operating the at least one computer to cause the cash value to be allocated to the merchant responsive to the amount of payment being verified by the at least one computer as being at least as great as the purchase price.

4. The method according to claim 3 wherein the at least one payment reading device includes at least one verification device, wherein step (d) includes operating the at least one verification device in determining the amount of the payment.

5. The method according to claim 4 wherein the at least one verification device includes a cash validator device, wherein step (c) includes receiving at least part of the payment in cash, wherein step (d) includes operating the cash validator device in determining the amount of the payment.

6. The method according to claim 4 wherein the at least one verification device includes a check reader device, wherein step (c) includes receiving at least part of the payment by check, wherein step (d) includes operating the check reader device in determining the amount of payment.

7. The method according to claim 2 wherein the at least one reader device comprises a card reader,
   wherein step (f) includes operating the card reader to read card data received from a machine user.

8. The method according to claim 7 wherein the at least one reader device comprises a biometric reader,
   wherein step (f) includes operating the biometric reader to read biometric data received from the machine user.

9. The method according to claim 8 wherein the machine includes at least one payment accepting device,
   wherein step (g) includes operating the at least one computer to cause the read card data and the read biometric data to be compared,
   wherein step (h) includes allowing the machine user to use the payment accepting device responsive to the read card data and the read biometric data having a predetermined relationship,
   wherein step (c) includes receiving the payment for the order through the payment accepting device.

10. The method according to claim 1 and further comprising:
    prior to step (a):

(f) selecting online through the web site of the merchant, the at least one item for purchase;

(g) receiving the order identifier from the web site;

(h) providing the order identifier received in step (g) to the machine;

wherein step (a) includes operating the machine to receive the order identifier provided in step (h).

11. The method according to claim 1, wherein the machine includes at least one cash dispenser, wherein the customer payment received in step (c) includes cash, and further comprising:

(f) operating the machine to store the cash received in step (c) in the at least one cash dispenser;

(g) subsequent to step (f), operating the machine to receive a request for a cash withdrawal transaction;

(h) responsive to step (g), operating the at least one cash dispenser to cause cash to be dispensed from the machine, wherein at least some of the dispensed cash includes cash stored in step (f).

12. Apparatus comprising:

an automated banking machine, wherein the machine is operative to receive from an authorized user of the machine, an order identifier corresponding to an order for at least one item previously selected sans the machine through a web site of an online merchant, wherein responsive to receiving the order identifier, the machine operates to receive a purchase price associated with the order, wherein the machine is operative to receive from the user on behalf of the merchant, a payment including at least one of a check and cash for the order, wherein responsive to receiving the payment, the machine operates to determine an amount of the payment, wherein responsive to the amount of the payment being at least as great as the purchase price, the machine operates to cause a cash value corresponding to the purchase price to be allocated to the merchant as payment for the order.

13. The apparatus according to claim 12 wherein the machine includes at least one computer in operative connection with at least one reader device, wherein the at least one reader device is operative to read user data received from a machine user, wherein the at least one computer is operative to cause the user data. to be compared with authorized machine user data, wherein the at least one computer is operative to allow the machine user to use the machine to make payment for the order responsive to the user data having a predetermined relationship with the authorized machine user data.

14. The apparatus according to claim 13 wherein the at least one reader device comprises a card reader, wherein the card reader is operative to read card data received from a machine user.

15. The apparatus according to claim 14 wherein the at least one reader device comprises a biometric reader, wherein the biometric reader is operative to read biometric data received from the machine user.

16. The apparatus according to claim 15 wherein the machine includes at least one payment accepting device, wherein the at least one computer is operative to cause the read card data and the read biometric data to be compared, wherein the at least one computer is operative to allow the machine user to use the payment accepting device responsive to the read card data and the read biometric data having a predetermined relationship, wherein the machine is operative to receive the payment for the order through the payment accepting device.

17. The apparatus according to claim 12 wherein the machine includes at least one computer in operative connection with a payment accepting device, a payment reading device, at least one input device, and at least one data reading device operative to read user-provided data, wherein the at least one computer is operative to cause read user data to be compared with authorized machine user data, wherein responsive to read user data having a predetermined relationship with authorized machine user data, the at least one computer is operates to allow a machine user to use the payment accepting device, wherein the at least one input device is adapted to receive at least one input comprising the order identifier, wherein responsive to receiving the order identifier, the machine operates to communicate with the merchant web site to receive the purchase price, wherein the machine is operative to receive the payment through the payment accepting device, wherein the at least one payment reading device is operative to read payment received through the payment accepting device, wherein the at least one payment reading device includes at least one verification device, wherein the at least one computer is operative to use the at least one verification device to determine an amount of payment received through the payment accepting device, wherein the at least one computer is operative to verify whether an amount of read payment is at least as great as the purchase price, wherein responsive to the amount of payment being verified by the at least one computer as being at least as great as the purchase price, the at least one computer is operative to cause the cash value to be allocated to the merchant.

18. The apparatus according to claim 17 wherein the at least one verification device includes a cash validator device.

19. The apparatus according to claim 17 wherein the at least one verification device includes a check reader device.

20. The apparatus according to claim 12 wherein the machine includes at least one cash dispenser, wherein the machine is operative to receive a cash payment for an order, wherein the machine is operative to store cash received in a cash payment in the at least one cash dispenser, wherein the machine is operative to receive a request for a cash withdrawal transaction, wherein responsive to receiving a request for a cash withdrawal transaction, the machine is operative to cause the at least one cash dispenser to dispense cash from the machine, wherein at least some of the dispensed cash includes stored cash received in a cash payment.

21. A method comprising:

(a) operating at least one data reader device of an automated banking machine to read user identifying data associated with a machine user, wherein the machine includes at least one banking machine computer in operative connection with at least one input device, at least one payment accepting device, and at least one payment reading device, wherein the at least one payment reading device includes a check reader device;

(b) operating the at least one banking machine computer to cause the user identifying data read in step (a) to be compared with authorized machine user data;

(c) subsequent to step (b), responsive to the user identifying data having a predetermined relationship with authorized machine user data, operating the at least one banking machine computer to allow the machine user to use the machine to make at least one payment;

(d) subsequent to step (c), operating the at least one input device to receive from the machine user, an order identifier corresponding to an order for at least one item previously selected sans the machine through a web site of an online merchant, wherein the machine is operative to cause an account of the merchant to be credited a cash value;

(e) responsive to the order identifier received in step (d), operating the machine to operatively communicate with a merchant computer associated with the merchant to receive an amount due associated with the order;

(f) subsequent to step (c), operating the machine to receive from the user, payment for the order through the at least one payment accepting device, wherein the payment includes at least one of a check and cash;

(g) operating the at least one payment reading device to read the payment received in step (f);

(h) operating the at least one banking machine computer to calculate a payment amount corresponding to the payment read in step (g);

(i) operating the at least one banking machine computer to determine whether the payment amount calculated in step (h) is at least as great as the amount due received in step (e); and (j) responsive to a positive determination in step (i), operating the at least one banking machine computer to cause a cash value corresponding to the amount due to be credited to the account of the merchant as payment for the order.

* * * * *

UNITED STATES PATENT AND TRADEMARK OFFICE
CERTIFICATE OF CORRECTION

| | | |
|---|---|---|
| PATENT NO. | : 7,644,041 B1 | Page 1 of 1 |
| APPLICATION NO. | : 10/376955 | |
| DATED | : January 5, 2010 | |
| INVENTOR(S) | : Schultz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1660 days.

Signed and Sealed this

Sixteenth Day of November, 2010

David J. Kappos
*Director of the United States Patent and Trademark Office*